(12) United States Patent
Shimoe et al.

(10) Patent No.: US 12,128,543 B2
(45) Date of Patent: Oct. 29, 2024

(54) INFORMATION PROCESSING DEVICE AND INFORMATION PROCESSING METHOD

(71) Applicant: SONY GROUP CORPORATION, Tokyo (JP)

(72) Inventors: Takeaki Shimoe, Tokyo (JP); Daisuke Mochizuki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 480 days.

(21) Appl. No.: 17/293,243

(22) PCT Filed: Oct. 11, 2019

(86) PCT No.: PCT/JP2019/040162
§ 371 (c)(1),
(2) Date: May 12, 2021

(87) PCT Pub. No.: WO2020/105309
PCT Pub. Date: May 28, 2020

(65) Prior Publication Data
US 2022/0001547 A1    Jan. 6, 2022

(30) Foreign Application Priority Data
Nov. 21, 2018  (JP) ................................ 2018-218481

(51) Int. Cl.
*B25J 11/00* (2006.01)
*A63H 3/36* (2006.01)
(Continued)

(52) U.S. Cl.
CPC .............. *B25J 11/003* (2013.01); *A63H 3/36* (2013.01); *B25J 9/0003* (2013.01); *B25J 9/163* (2013.01);
(Continued)

(58) Field of Classification Search
CPC ....... G10L 15/22; B25J 11/003; B25J 9/0003; B25J 9/163; B25J 13/08; G06V 40/20;
(Continued)

(56) References Cited

U.S. PATENT DOCUMENTS

| 6,537,128 | B1 | 3/2003 | Hampton et al. |
| 6,980,956 | B1 | 12/2005 | Takagi et al. |

(Continued)

FOREIGN PATENT DOCUMENTS

| CN | 1380846 A | 11/2002 |
| CN | 102548624 A | 7/2012 |

(Continued)

OTHER PUBLICATIONS

English WIPO translation of WO 2018016461 (Year: 2018).*

(Continued)

*Primary Examiner* — Jason Holloway
*Assistant Examiner* — Christopher A Buksa
(74) *Attorney, Agent, or Firm* — CHIP LAW GROUP

(57) ABSTRACT

An information processing device is provided including a recognition unit that executes recognition processing used to determine an action of an autonomous operating body on the basis of sensor information collected, in which the recognition unit includes a feedback recognizer that recognizes feedback from a user on behavior executed by the autonomous operating body, and the feedback recognizer recognizes a degree of the feedback on the basis of recognition results of a contact action and a non-contact action by the user for the autonomous operating body.

17 Claims, 16 Drawing Sheets

(51) Int. Cl.
*B25J 9/00* (2006.01)
*B25J 9/16* (2006.01)
*B25J 13/08* (2006.01)
*G05B 19/4155* (2006.01)
*G06V 40/20* (2022.01)
*G10L 15/22* (2006.01)

(52) U.S. Cl.
CPC .......... *B25J 13/08* (2013.01); *G05B 19/4155* (2013.01); *G06V 40/20* (2022.01); *G10L 15/22* (2013.01); *A63H 2200/00* (2013.01); *G05B 2219/50391* (2013.01)

(58) Field of Classification Search
CPC .. A63H 3/36; A63H 2200/00; G05B 19/4155; G05B 2219/50391
See application file for complete search history.

(56) References Cited

U.S. PATENT DOCUMENTS

| | | |
|---|---|---|
| 2002/0049515 A1 | 4/2002 | Osawa |
| 2002/0158599 A1 | 10/2002 | Fujita et al. |
| 2007/0192910 A1* | 8/2007 | Vu .................. G05D 1/0246 901/1 |
| 2009/0055019 A1 | 2/2009 | Stiehl et al. |
| 2013/0178982 A1 | 7/2013 | Wong et al. |
| 2018/0285672 A1 | 10/2018 | Yamaya et al. |
| 2019/0143528 A1 | 5/2019 | Hayashi |

FOREIGN PATENT DOCUMENTS

| | | |
|---|---|---|
| CN | 108664889 A | 10/2018 |
| CN | 109475781 A | 3/2019 |
| EP | 1092514 A1 | 4/2001 |
| EP | 1195231 A1 | 4/2002 |
| JP | 2003-340760 A | 12/2003 |
| JP | 2011-054088 A | 3/2011 |
| JP | 2011-115944 A | 6/2011 |
| JP | 2018-165881 A | 10/2018 |
| KR | 10-2002-0008848 A | 1/2002 |
| WO | 2000/040377 A1 | 7/2000 |
| WO | 2000/067959 A1 | 11/2000 |
| WO | 2001/072478 A1 | 10/2001 |
| WO | 2018/016461 A1 | 1/2018 |

OTHER PUBLICATIONS

Extended European Search Report of EP Application No. 19886608.9, issued on Jan. 28, 2022, 10 pages.

International Search Report and Written Opinion of PCT Application No. PCT/JP2019/040162, issued on Dec. 10, 2019, 10 pages of ISRWO.

Office Action for CN Patent Application No. 2019800753859, issued on May 30, 2022, 09 pages of English Translation and 09 pages of Office Action.

* cited by examiner

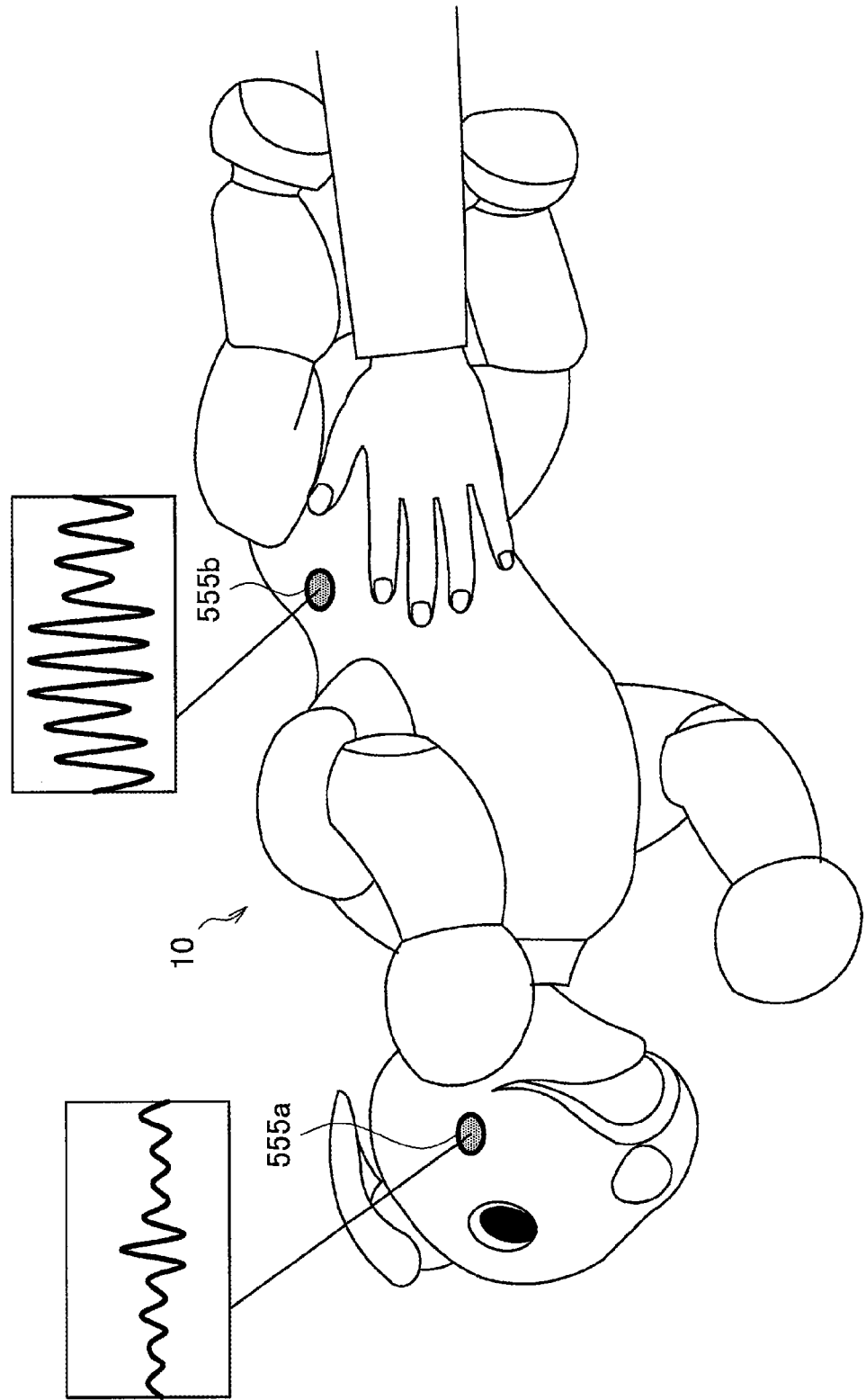

FIG.15

| | VERY BAD | BAD | GOOD | VERY GOOD |
|---|---|---|---|---|
| ABDOMEN | STRONGLY HIT | NOTHING IS DONE ALTHOUGH ABDOMEN IS SHOWN | STROKED WHILE ABDOMEN IS SHOWN | REPEATEDLY STROKED FOR MORE THAN PREDETERMINED TIME |
| BACK | STRONGLY HIT | LIGHTLY HIT | LIGHTLY STROKED | REPEATEDLY STROKED FOR MORE THAN PREDETERMINED TIME |
| HEAD | STRONGLY HIT | LIGHTLY HIT | LIGHTLY STROKED | HEAD IS STRONGLY STROKED TO BE PRAISED |

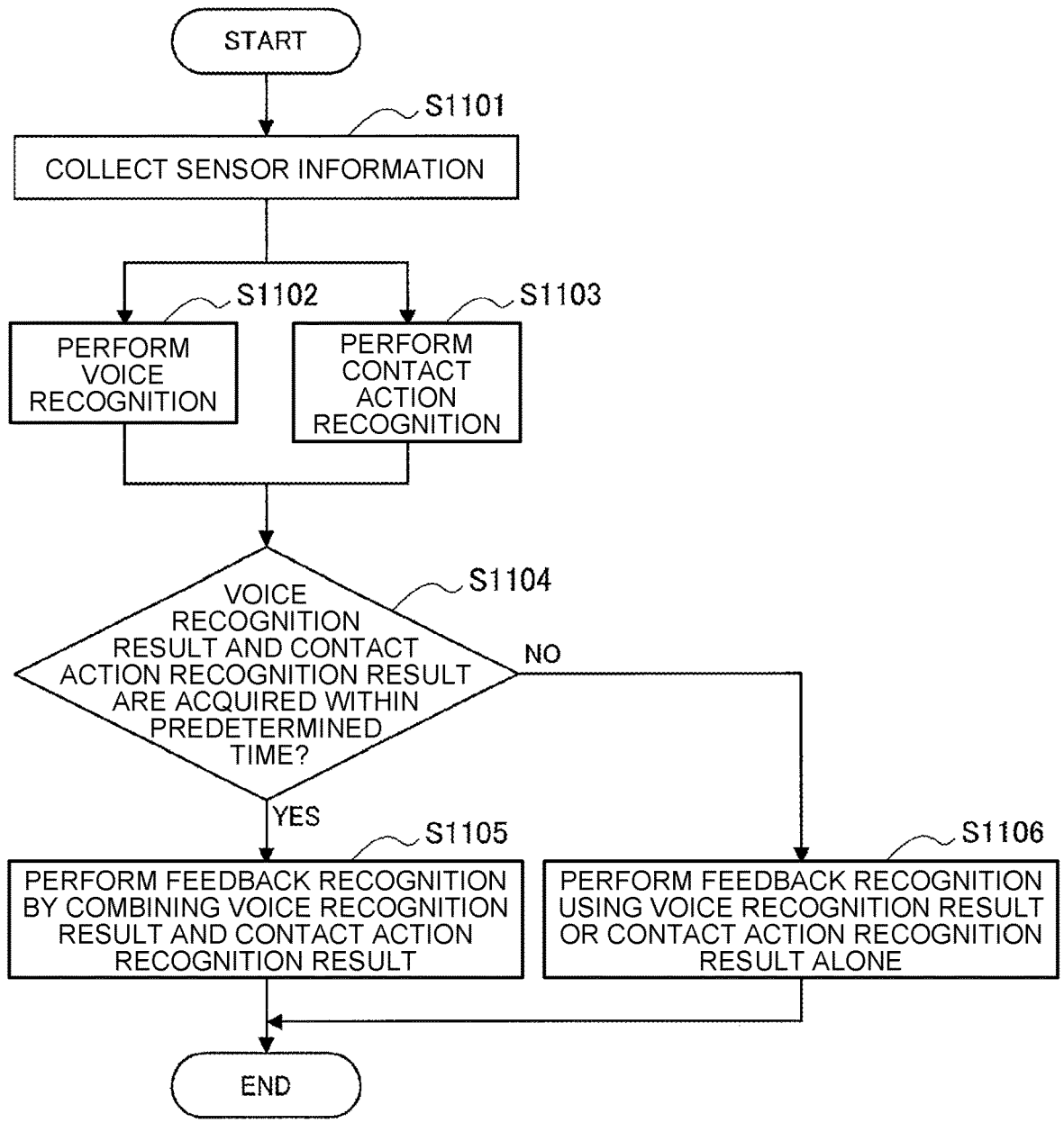

|  | NON-CONTACT ACTION GOOD | NON-CONTACT ACTION BAD |
|---|---|---|
| CONTACT ACTION GOOD | FB:VERY GOOD | FB:GOOD |
| CONTACT ACTION BAD | FB:BAD | FB:VERY BAD |

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2019/040162 filed on Oct. 11, 2019, which claims priority benefit of Japanese Patent Application No. JP 2018-218481 filed in the Japan Patent Office on Nov. 21, 2018. Each of the above-referenced applications is hereby incorporated herein by reference in its entirety.

FIELD

The present disclosure relates to an information processing device, an information processing method, and a program.

BACKGROUND

In recent years, devices have been developed that operate autonomously on the basis of various types of recognition processing. For example, in Patent Literature 1, a robot device is disclosed that recognizes states of an environment and a user, and performs an action depending on the states.

CITATION LIST

Patent Literature

Patent Literature 1: JP 2003-340760 A

SUMMARY

Technical Problem

Here, in an autonomous operating body such as the robot device described in Patent Literature 1, it is important to recognize feedback from a user on an executed action with high accuracy, and correctly reflect a result of the recognition in a subsequent action.

Solution to Problem

According to the present disclosure, an information processing device is provided that includes a recognition unit that executes recognition processing used to determine an action of an autonomous operating body on a basis of sensor information collected, wherein the recognition unit includes a feedback recognizer that recognizes feedback from a user on behavior executed by the autonomous operating body, and the feedback recognizer recognizes a degree of the feedback on a basis of recognition results of a contact action and a non-contact action by the user for the autonomous operating body.

Moreover, according to the present disclosure, an information processing method is provided that includes executing, by a processor, recognition processing used to determine an action of an autonomous operating body on a basis of sensor information collected, wherein the executing the recognition processing further includes using a feedback recognizer that recognizes feedback from a user on behavior executed by the autonomous operating body, and recognizing a degree of the feedback on a basis of recognition results of a contact action and a non-contact recognition action by the user for the autonomous operating body.

Moreover, according to the present disclosure, a program is provided that causes a computer to function as an information processing device including a recognition unit that executes recognition processing used to determine an action of an autonomous operating body on a basis of sensor information collected, wherein the recognition unit includes a feedback recognizer that recognizes feedback from a user on behavior executed by the autonomous operating body, and the feedback recognizer recognizes a degree of the feedback on a basis of recognition results of a contact action and a non-contact recognition action by the user for the autonomous operating body.

BRIEF DESCRIPTION OF DRAWINGS

FIG. 14 is a diagram for explaining recognition of a contact action using an inertial sensor according to the embodiment.

FIG. 15 is a diagram illustrating an example of classification of contact actions by a physical contact recognizer according to the embodiment.

FIG. 16 is a diagram illustrating an example of classification of contact actions by a voice recognizer according to the embodiment.

FIG. 17 is a flowchart illustrating a flow of the feedback recognition according to the embodiment.

DESCRIPTION OF EMBODIMENTS

Figure 1:
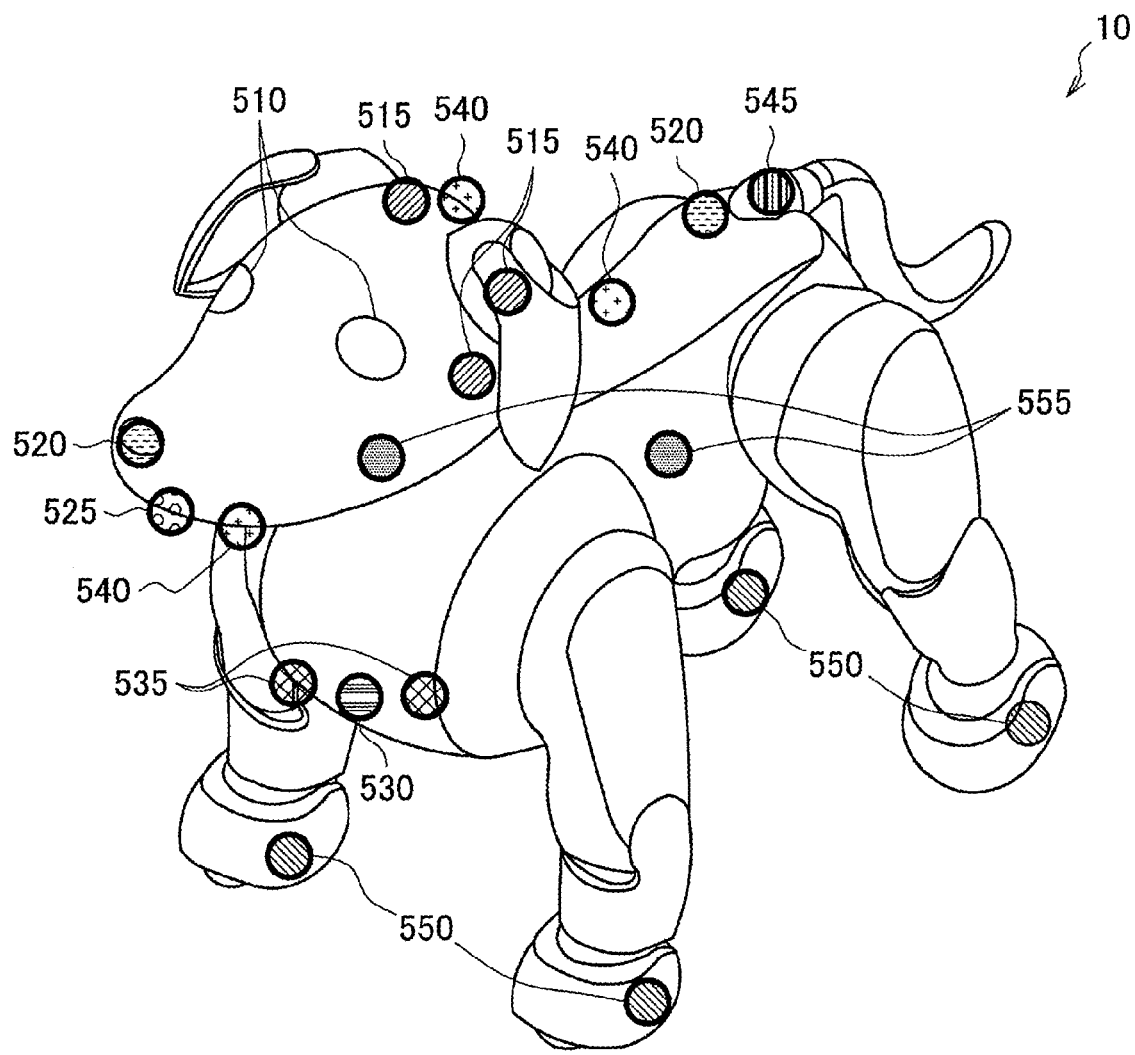
FIG. 1 is a diagram illustrating a hardware configuration example of an autonomous mobile body according to a first embodiment of the present disclosure.

Hereinafter, a description will be given in detail of preferred embodiments of the present disclosure with reference to the accompanying drawings. Note that, in the present specification and the drawings, components having substantially the same functional configuration are designated by the same reference numerals to omit duplicate description.

Note that, the description will be given in the following order.

1. Embodiment
1.1. Outline of autonomous operating body 10
1.2. Hardware configuration example of autonomous operating body 10
1.3. Functional outline
1.4. System configuration example
1.5. Functional configuration example of autonomous operating body 10
1.6. Details of functions
2. Conclusion

1. Embodiment

<<1.1. Outline of autonomous operating body 10>>

First, a description will be given of an outline of an autonomous operating body 10 according to an embodiment of the present disclosure. The autonomous operating body 10 according to the embodiment of the present disclosure is an information processing device that executes situation estimation based on sensor information collected, and autonomously selects and executes various operations depending on situations. One of features of the autonomous operating body 10 is that the autonomous operating body 10 autonomously executes an operation presumed to be optimal for each situation, unlike a robot that simply performs an operation in accordance with a user's instruction command.

The autonomous operating body 10 according to the embodiment of the present disclosure can, for example, execute user recognition or object recognition based on an image imaged, and perform various autonomous actions depending on a user or an object recognized. Furthermore, the autonomous operating body 10 according to the present embodiment can also execute, for example, voice recognition based on an utterance of the user and perform an action based on the user's instruction or the like.

As described above, the autonomous operating body 10 according to the embodiment of the present disclosure determines and executes an autonomous operation by comprehensively determining a desire, an emotion, a surrounding environment, and the like, similarly to an animal including a human. In the above points, the autonomous operating body 10 is clearly different from a passive device that executes a corresponding operation or processing on the basis of an instruction.

The autonomous operating body 10 according to the embodiment of the present disclosure may be an autonomous mobile robot that autonomously moves in a space and executes various operations. The autonomous operating body 10 may be, for example, an autonomous mobile robot having a shape and operational ability imitating an animal such as a human or a dog. Furthermore, the autonomous operating body 10 may be, for example, a vehicle or another device having an ability to communicate with the user. The shape, ability, and levels of the desire and the like of the autonomous operating body 10 according to the embodiment of the present disclosure may be appropriately designed depending on the object and role.

<<1.2. Hardware Configuration Example of Autonomous Operating Body 10>>

Next, a description will be given of a hardware configuration example of the autonomous operating body 10 according to the embodiment of the present disclosure. Note that, in the following, as an example, a case will be described where the autonomous operating body 10 is a dog-shaped four-legged walking robot.

FIG. 1 is a diagram illustrating a hardware configuration example of the autonomous operating body 10 according to the embodiment of the present disclosure. As illustrated in FIG. 1, the autonomous operating body 10 is a dog-shaped four-legged walking robot having a head, a body, four legs, and a tail. Furthermore, the autonomous operating body 10 includes two displays 510 on the head.

Furthermore, the autonomous operating body 10 includes various sensors. The autonomous operating body 10 includes, for example, microphones 515, cameras 520, a time of flight (ToF) sensor 525, a human sensor 530, distance measurement sensors 535, touch sensors 540, an illuminance sensor 545, sole buttons 550, and inertial sensors 555.

(Microphone 515)

The microphone 515 has a function of collecting surrounding sounds. The above sounds include, for example, the utterance of the user and surrounding environmental sounds. The autonomous operating body 10 may include, for example, four microphones on the head. By including multiple microphones 515, it becomes possible to collect sounds generated in the surroundings with high sensitivity and to implement localization of a sound source.

(Camera 520)

The camera 520 has a function of capturing an image of the user and the surrounding environment. The autonomous operating body 10 may include, for example, two wide-angle cameras at the tip of the nose and the waist. In this case, the wide-angle camera arranged at the tip of the nose captures an image corresponding to a front field of view of the autonomous operating body (that is, the dog's field of view), and the wide-angle camera at the waist captures an image of a surrounding area centered on the upper side. The autonomous operating body 10 can extract feature points of a ceiling on the basis of an image captured by the wide-angle camera arranged on the waist, for example, and implement simultaneous localization and mapping (SLAM).

(ToF Sensor 525)

The ToF sensor 525 has a function of detecting a distance to an object existing in front of the head. The ToF sensor 525 is included at the tip of the nose of the head. With the ToF sensor 525, distances to various objects can be detected with high accuracy, and it becomes possible to implement an operation depending on a relative position to an obstacle, an object including the user, or the like.

(Human Sensor 530)

The human sensor 530 has a function of detecting a location of the user or a pet kept by the user. The human sensor 530 is arranged, for example, on the chest. With the human sensor 530, by detecting a moving object existing in front, it becomes possible to implement various operations on the moving object, for example, operations depending on emotions such as interest, fear, and surprise.

(Distance Measurement Sensor 535)

The distance measurement sensor 535 has a function of acquiring a situation of a front floor surface of the autonomous operating body 10. The distance measurement sensor 535 is arranged, for example, on the chest. With the distance measurement sensor 535, it is possible to detect a distance to an object existing on the front floor surface of the autonomous operating body 10 with high accuracy, and it is possible to implement an operation depending on a relative position to the object.

(Touch Sensor 540)

The touch sensor 540 has a function of detecting contact by the user. The touch sensor 540 is arranged at, for example, a part where the user is highly likely to touch the autonomous operating body 10, such as the top of the head, under the chin, and the back. The touch sensor 540 may be, for example, a capacitance type or pressure sensitive type touch sensor. With the touch sensor 540, it is possible to detect a contact action such as touching, stroking, hitting, or pushing by the user, and it becomes possible to perform an operation depending on the contact action.

(Illuminance Sensor 545)

The illuminance sensor 545 detects illuminance in the space where the autonomous operating body 10 is positioned. The illuminance sensor 545 may be arranged at the base of the tail in the back face of the head, for example. With the illuminance sensor 545, it becomes possible to detect surrounding brightness, and execute an operation depending on the brightness.

(Sole Button 550)

The sole button 550 has a function of detecting whether or not the bottom surface of the leg of the autonomous operating body 10 is in contact with the floor. For this reason, the sole button 550 is arranged at each of parts corresponding to the pads of the four legs. With the sole button 550, it is possible to detect contact or non-contact between the autonomous operating body 10 and the floor surface, and it becomes possible to grasp, for example, that the autonomous operating body 10 is lifted by the user.

(Inertial Sensor 555)

The inertial sensor 555 is a 6-axis sensor that detects physical quantities such as velocity, acceleration, and rotation of the head and body. That is, the inertial sensor 555 detects acceleration and angular velocity on the X-axis, Y-axis, and Z-axis. The inertial sensor 555 is arranged on each of the head and body. With the inertial sensor 555, it becomes possible to detect movements of the head and body of the autonomous operating body 10 with high accuracy, and implement operation control depending on a situation.

In the above, examples have been described of the sensors included in the autonomous operating body 10 according to the embodiment of the present disclosure. Note that, the above configuration described with reference to FIG. 1 is merely an example, and the configuration of the sensors that can be included in the autonomous operating body 10 is not limited to such an example. In addition to the above configuration, the autonomous operating body 10 may further include, for example, a temperature sensor, a geomagnetic sensor, various communication devices including a global navigation satellite system (GLASS) signal receiver, and the like. The configuration of the sensors included in the autonomous operating body 10 may be flexibly modified depending on specifications and operation.

Figure 2:
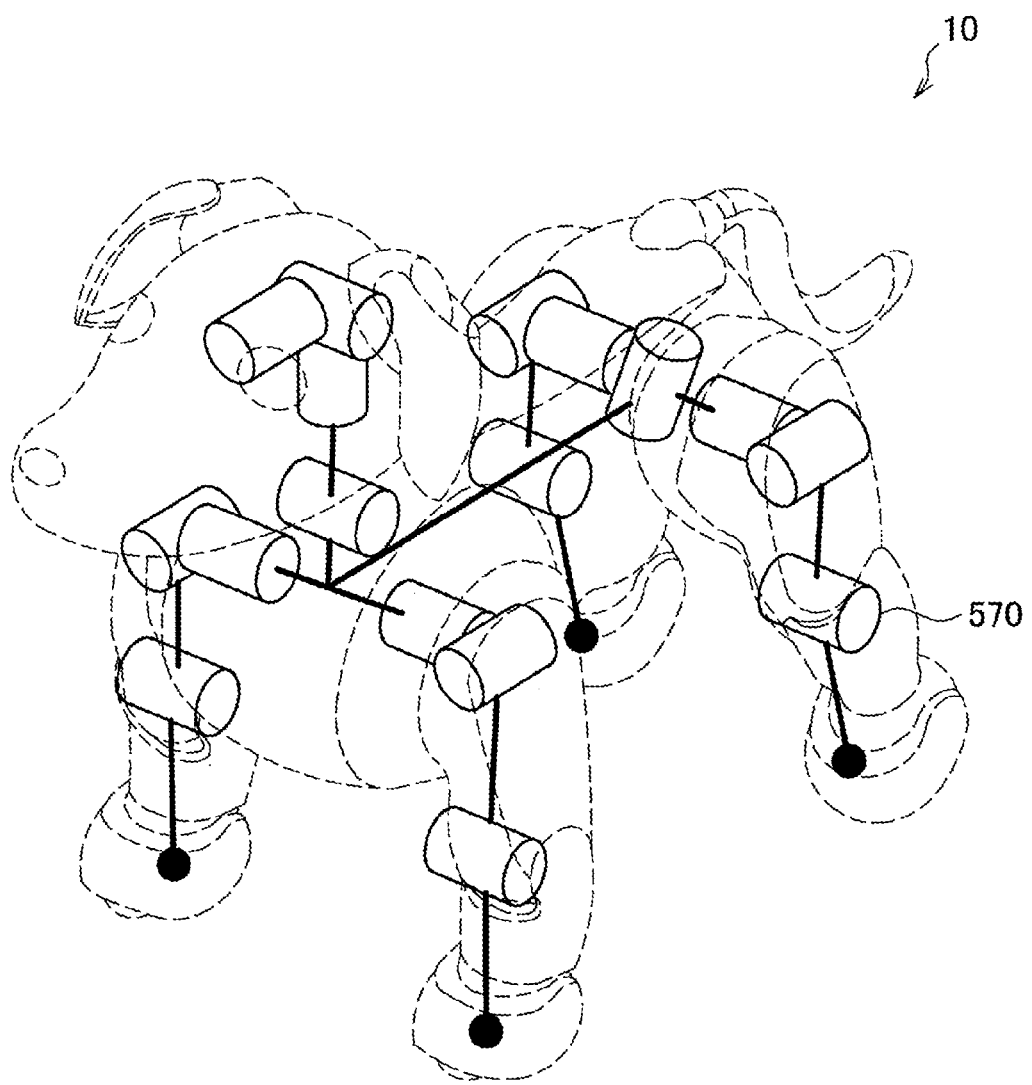
FIG. 2 is a configuration example of actuators included in the autonomous mobile body according to the embodiment.

Subsequently, a description will be given of a configuration example of a joint of the autonomous operating body 10 according to the embodiment of the present disclosure. FIG. 2 is a configuration example of actuators 570 included in the autonomous operating body 10 according to the embodiment of the present disclosure. The autonomous operating body 10 according to the embodiment of the present disclosure has a total of 22 degrees of freedom of rotation, two each at the ears and the tail, and one at the mouth, in addition to rotation points illustrated in FIG. 2.

For example, the autonomous operating body 10 has three degrees of freedom in the head, thereby being able to achieve both movements of nodding and tilting the neck. Furthermore, the autonomous operating body 10 can implement a natural and flexible movement closer to that of a real dog by reproducing a swing movement of the waist by the actuator 570 included in the waist.

Note that, the autonomous operating body 10 according to the embodiment of the present disclosure may implement the above 22 degrees of freedom of rotation by, for example, combining a 1-axis actuator and a 2-axis actuator. For example, the 1-axis actuator may be adopted for the elbow or knee portion of the leg, and the 2-axis actuator may be adopted for the shoulder and the base of the thigh.

Figure 3:
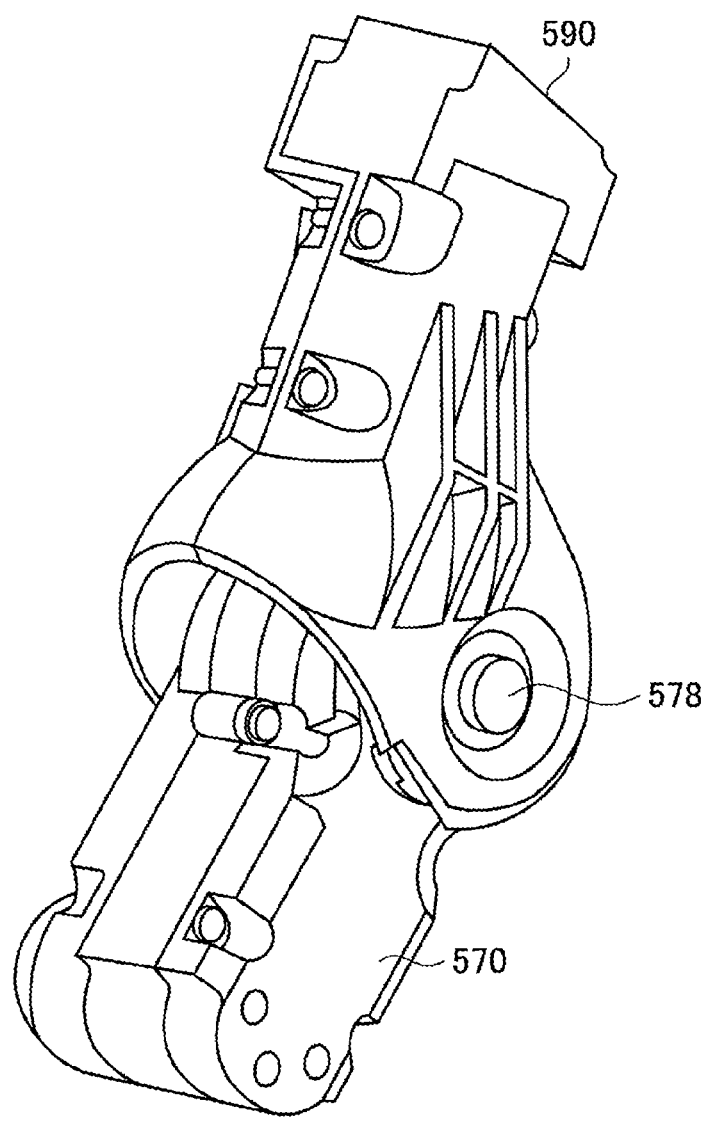
FIG. 3 is a diagram for explaining operation of the actuator included in the autonomous mobile body according to the embodiment.
Figure 4:
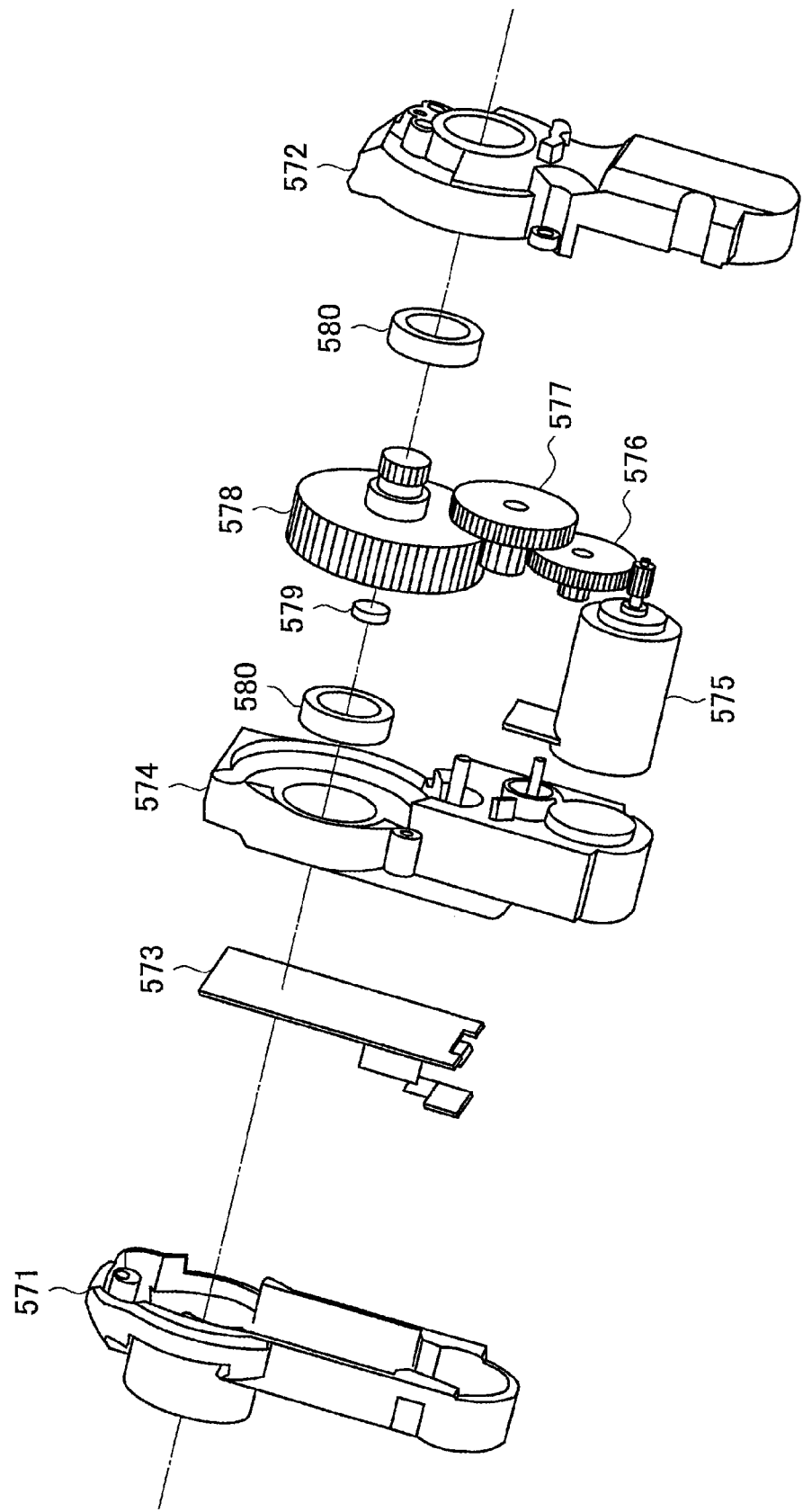
FIG. 4 is a diagram for explaining the operation of the actuator included in the autonomous mobile body according to the embodiment.

FIGS. 3 and 4 are diagrams for explaining operation of the actuator 570 included in the autonomous operating body 10 according to the embodiment of the present disclosure. Referring to FIG. 3, the actuator 570 can drive a movable arm 590 at an arbitrary rotation position and rotation speed by rotating an output gear by a motor 575.

Referring to FIG. 4, the actuator 570 according to the embodiment of the present disclosure includes a rear cover 571, a gear BOX cover 572, a control board 573, a gear BOX base 574, the motor 575, a first gear 576, a second gear 577, an output gear 578, a detection magnet 579, and two bearings 580.

The actuator 570 according to the embodiment of the present disclosure may be, for example, a magnetic spin-valve giant magnetoresistive (svGMR). The control board 573 rotates the motor 575 on the basis of control of a main processor, whereby power is transmitted to the output gear 578 via the first gear 576 and the second gear 577, and it is possible to drive the movable arm 590.

Furthermore, a position sensor included in the control board 573 detects a rotation angle of the detection magnet 579 that rotates in synchronization with the output gear 578, whereby a rotation angle of the movable arm 590, that is, the rotation position can be detected with high accuracy.

Note that, the magnetic svGMR has advantages of having excellent durability since it is a non-contact type, and having less influence of signal fluctuations due to distance fluctuations of the detection magnet 579 and the position sensor by being used in a GMR saturation region.

In the above, a description has been given of the configuration example of the actuator 570 included in the autonomous operating body 10 according to the embodiment of the present disclosure. With the above configuration, it becomes possible to control bending and stretching movements of the joint included in the autonomous operating body 10 with high accuracy, and accurately detect a rotational position of the joint.

Figure 5:
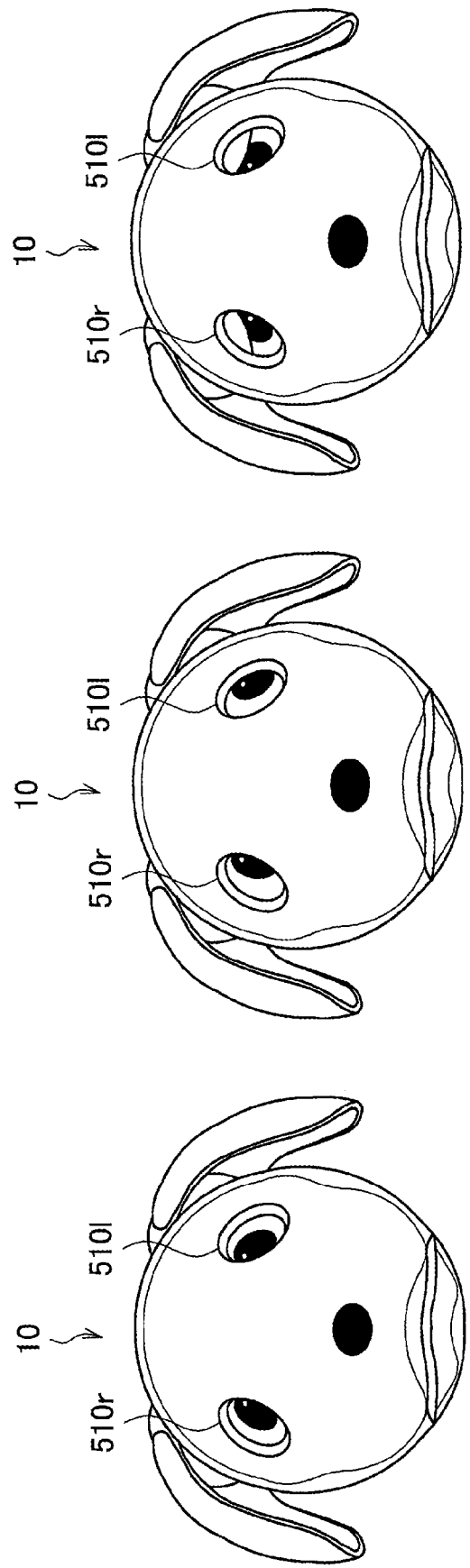
FIG. 5 is a diagram for explaining a function of displays included in the autonomous mobile body according to the embodiment.

Subsequently, with reference to FIG. 5, a description will be given of a function of the displays 510 included in the autonomous operating body 10 according to the embodiment of the present disclosure. FIG. 5 is a diagram for explaining the function of the displays 510 included in the autonomous operating body 10 according to the embodiment of the present disclosure.

(Displays 510)

The displays 510 have a function of visually expressing eye movements and emotions of the autonomous operating body 10. As illustrated in FIG. 5, the displays 510 can express movements of the eyeballs, the pupils, and the eyelids depending on emotions and movements. The displays 510 intentionally do not display characters, symbols, or images that are not related to eyeball movements, thereby producing natural movements closer to those of real animals such as dogs.

Furthermore, as illustrated in FIG. 5, the autonomous operating body 10 includes two displays 510r and 510l corresponding to the right eye and the left eye, respectively. The displays 510r and 510l are implemented by, for example, two independent organic light emitting diodes (OLEDs). With the OLED, it is possible to reproduce the curved surface of the eyeball, and a more natural exterior can be implemented compared with a case where a pair of the eyeballs are expressed with one flat display or a case where the two eyeballs are respectively expressed with two independent flat displays.

As described above, with the displays 510r and 510l, it becomes possible to express a line of sight and emotions of the autonomous operating body 10 as illustrated in FIG. 5 with high accuracy and flexibility. Furthermore, it becomes possible for the user to intuitively grasp a state of the autonomous operating body 10 from movements of the eyeballs displayed on the displays 510.

Figure 6:
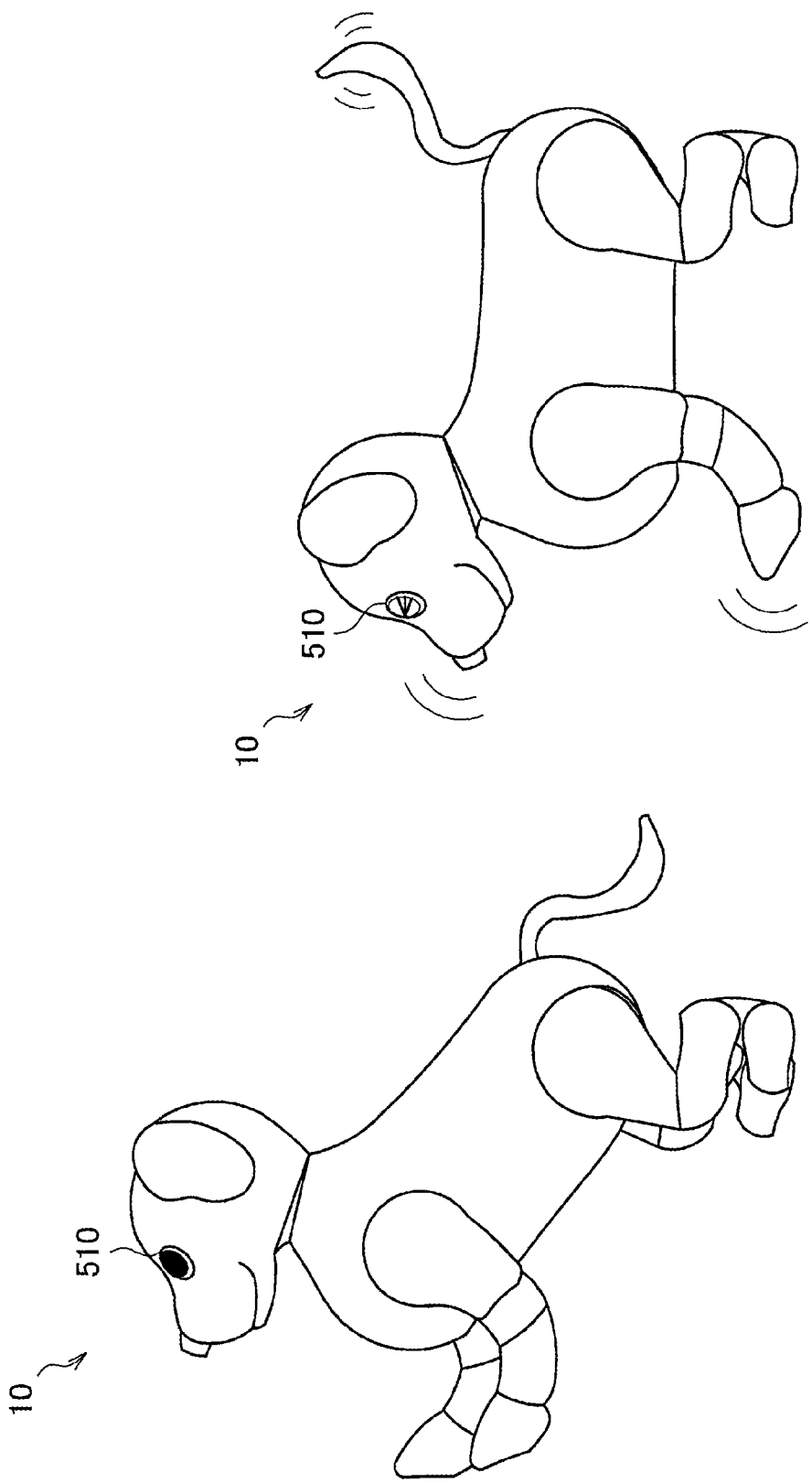
FIG. 6 is a diagram illustrating an operation example of the autonomous mobile body according to the embodiment.

In the above, the description has been given of the hardware configuration example of the autonomous operating body 10 according to the embodiment of the present disclosure. With the above configuration, as illustrated in FIG. 6, by controlling movements of the joint and eyeball of the autonomous operating body 10 with high accuracy and flexibility, it becomes possible to implement movements and emotional expressions closer to those of a real living thing. Note that, FIG. 6 is a diagram illustrating an operation example of the autonomous operating body 10 according to the embodiment of the present disclosure, and in FIG. 6, a description is given focusing on the movements of the joint and the eyeball of the autonomous operating body 10, and thus an external structure of the autonomous operating body 10 is illustrated in a simplified manner. Similarly, in the following description, the external structure of the autonomous operating body 10 may be illustrated in a simplified manner, but the hardware configuration and exterior of the autonomous operating body 10 according to the embodiment of the present disclosure are not limited to examples illustrated by the drawings, and may be designed as appropriate.

<<1.3. Functional Outline>>

Next, a description will be given of an outline of a function of the autonomous operating body 10 according to the embodiment of the present disclosure. As described above, in a device that performs an autonomous operation, it is important to recognize the feedback from the user on the executed action with high accuracy, and correctly reflect the result of the recognition in the subsequent action.

Here, the above feedback means, for example, that the user shows a reaction such as praise or scolding to an action (behavior) performed by the autonomous operating body 10. By recognizing the feedback as described above, the autonomous operating body 10 according to the present embodiment will perform behavior to be praised by the user more often, and will gradually cease to execute behavior to be scolded by the user.

Figure 7:
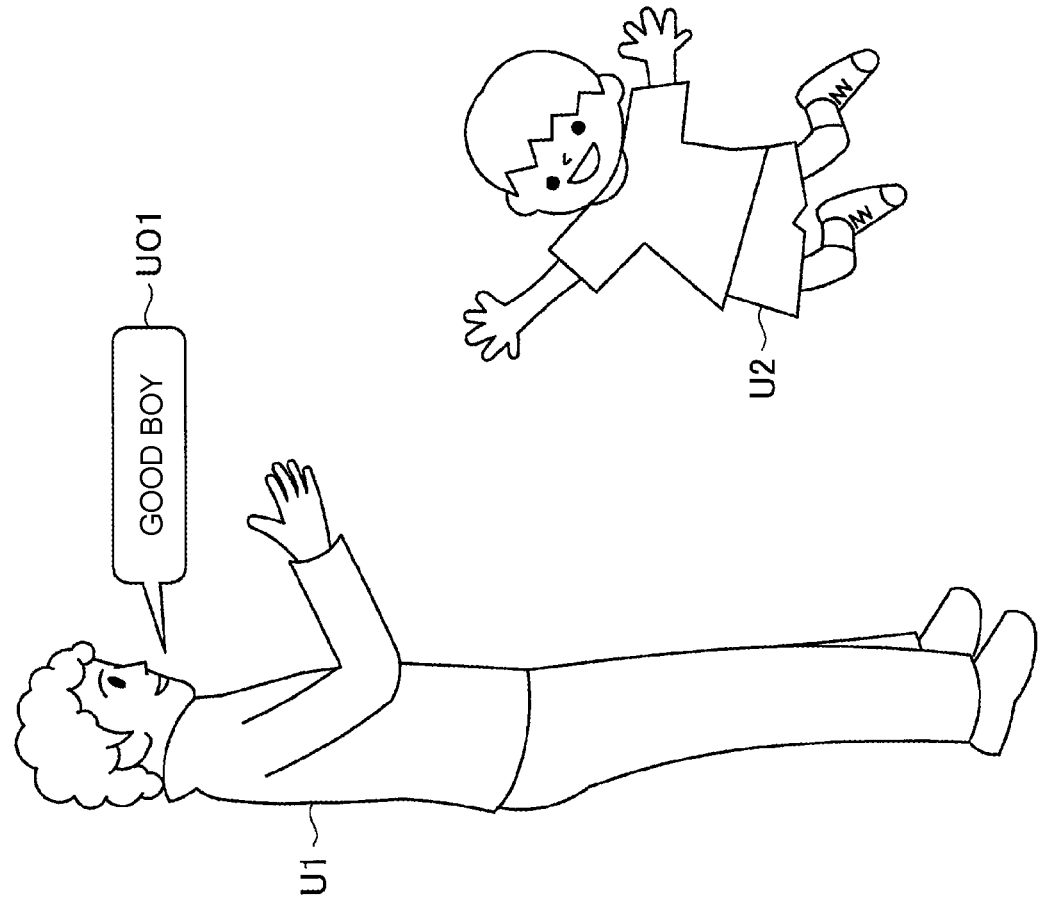
FIG. 7 is a diagram for explaining an example of a case where an autonomous operating body that is a comparison target according to the embodiment erroneously recognizes feedback from a user.
Figure 8:
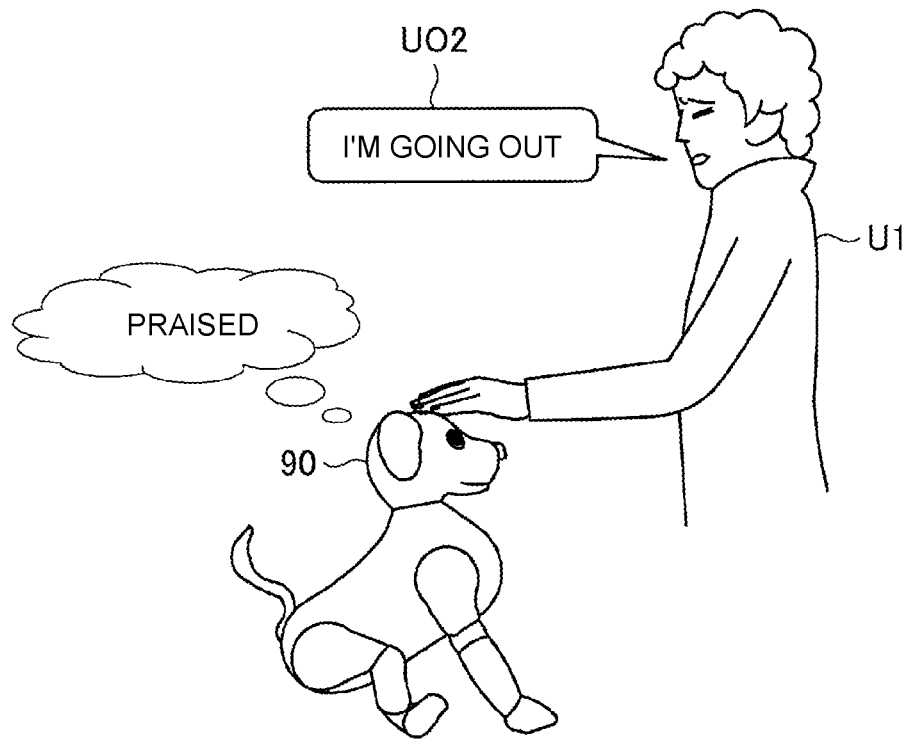
FIG. 8 is a diagram for explaining an example of a case where the autonomous operating body that is the comparison target according to the embodiment erroneously recognizes the feedback from the user.

However, in a case where the above feedback is erroneously recognized, there is a possibility that behavior that suits the user's taste will not be performed correctly. FIGS. 7 and 8 are diagrams for explaining examples of a case where an autonomous operating body 90 that is a comparison target according to the present embodiment erroneously recognizes the feedback from the user.

For example, in the case of the example illustrated in FIG. 7, the autonomous operating body 90 recognizes that a user U1 praises the autonomous operating body 90 by recognizing an utterance UO1 of the user U1 saying "Good boy". However, in reality, the utterance UO1 of the user U1 is directed to a user U2 being in the same space, and it can be said that the above feedback recognition by the autonomous operating body 90 is incorrect.

In this case, there is a possibility that the autonomous operating body 90 erroneously recognizes that the user U1 prefers behavior performed at the time of or immediately before the recognition of the utterance UO1, and thereafter, performs the behavior more. However, here, for example, in a case where an original evaluation by the user U1 for the behavior is low, a result may be obtained in which user experience is impaired.

Furthermore, in the case of the example illustrated in FIG. 8, the autonomous operating body 90 recognizes that the user U1 strokes the head of the autonomous operating body 90, thereby recognizing that the user U1 praises the autonomous operating body 90. However, in the example illustrated in FIG. 8, the user U1 merely strokes the head of the autonomous operating body 90 as a substitute for greeting when going out, as illustrated in an utterance UO2.

In this case as well, similarly to the case of the example illustrated in FIG. 7, there is a possibility that the autonomous operating body 90 erroneously recognizes that the user U1 prefers behavior performed at the time of or immediately before the recognition of an action of stroking the head, and thereafter, performs the behavior more.

As described above, in the feedback recognition using one of voice or contact, the feedback from the user may be erroneously recognized, and reliability is insufficient, and also it may be a cause of a situation in which actions that do not meet the user's intention occur frequently.

The technical concept according to the present disclosure is conceived by focusing on the above points, and makes it possible to recognize the feedback from the user on behavior of the autonomous operating body with high accuracy. For this reason, one of the features of the autonomous operating body 10 according to the embodiment of the present disclosure is that the autonomous operating body 10 comprehensively recognizes the feedback from the user on the basis of a plurality of pieces of sensor information collected, for example. Furthermore, at this time, the autonomous operating body 10 according to the embodiment of the present disclosure may recognize a type and a degree of the feedback from the user and reflect them in a later action plan.

Figure 9:
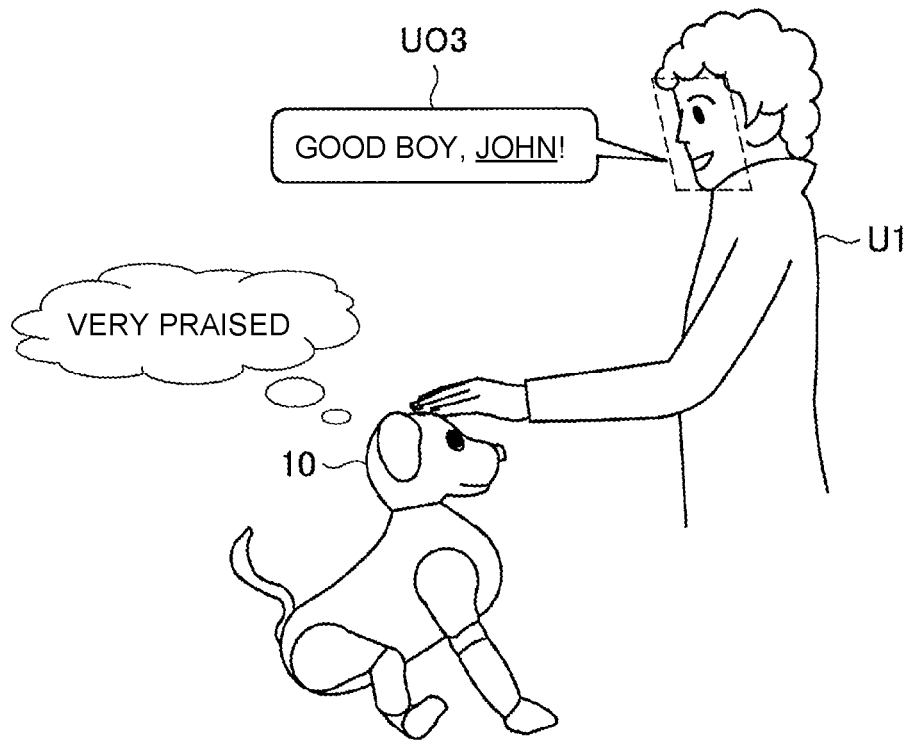
FIG. 9 is a diagram for explaining an outline of feedback recognition by the autonomous operating body according to the embodiment.

FIG. 9 is a diagram for explaining an outline of the feedback recognition by the autonomous operating body 10 according to the present embodiment. In the case of the example illustrated in FIG. 9, the user U1 strokes the head and makes an utterance UO3 saying "Good boy, John" in response to behavior performed by the autonomous operating body 10.

At this time, the autonomous operating body 10 according to the present embodiment recognizes that the head is stroked, by the touch sensor 540 arranged on the head, and also recognizes that the user U1 utters praising words, by performing voice recognition of the utterance UO3 collected by the microphones 515.

In this case, the autonomous operating body 10 according to the present embodiment can determine that the user U1 praises the autonomous operating body 10 since both the contact action of stroking the head and the recognition result of the non-contact action by the utterance UO3 indicate positive feedback.

Furthermore, the autonomous operating body 10 according to the present embodiment can comprehensively recognize the feedback from the user by using various types of information collected and recognized, not limited to the above. In the case of the example illustrated in FIG. 9, the autonomous operating body 10 can strengthen conviction that the feedback of the user U1 is positive by, for example, recognizing a smiling face of the user U1.

Furthermore, for example, the autonomous operating body 10 may determine that there is an extremely high possibility that the utterance UO3, that is, the positive feedback is directed to the autonomous operating body 10, by recognizing that the name of the autonomous operating body 10 is included in the utterance UO3 with the praising words.

As described above, the autonomous operating body 10 according to the present embodiment can recognize the type and degree of the feedback from the user with high accuracy by executing various types of recognition processing based on the sensor information collected, and use the feedback for an action planning after that.

Furthermore, in a general device, an electrostatic type or pressure sensitive type touch sensor is used to recognize the contact action such as stroking or hitting by the user. Here, for example, to recognize contact no matter where the contact is made on skin as in an actual living thing, it is necessary to arrange the touch sensors on the entire exterior of the device. However, such an arrangement of the touch sensors is not realistic since it increases development cost. For this reason, it has been difficult for a conventional device to recognize the contact action by the user for a part where the touch sensor is not arranged.

On the other hand, in the autonomous operating body 10 according to the present embodiment, each joint is provided with play to disperse force even in a standing state. For this reason, in the autonomous operating body 10 according to the present embodiment, a minute vibration is generated no matter which part is subjected to the contact action.

Thus, the autonomous operating body 10 according to the present embodiment can identify a characteristic vibration generated at the time of contact with each part by detecting the above minute vibration by the inertial sensor 555, and determine a part on which the contact action is performed.

Figure 10:
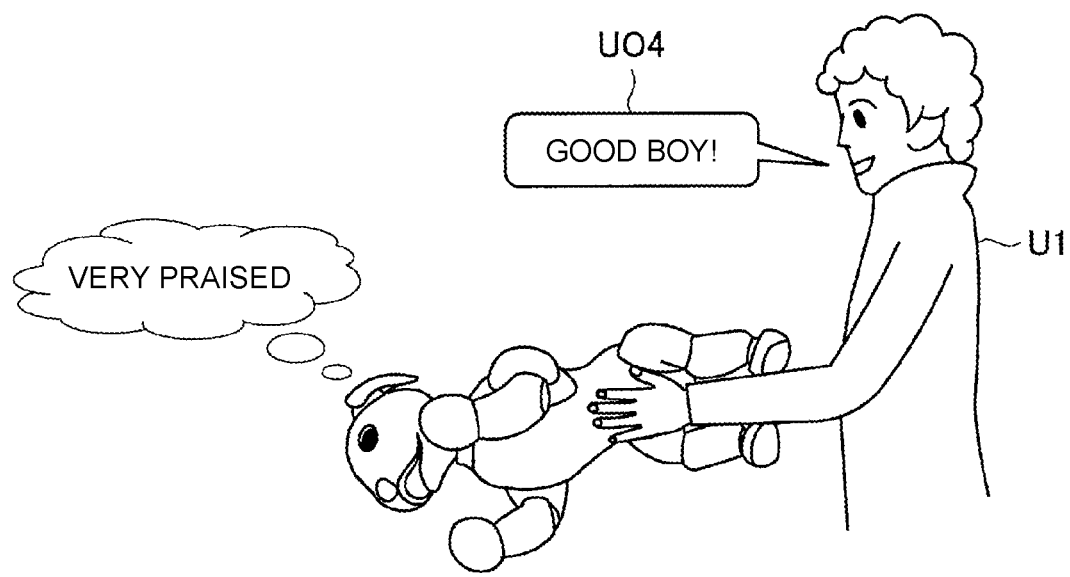
FIG. 10 is a diagram illustrating an example of contact part determination based on a minute vibration according to the embodiment.

FIG. 10 is a diagram illustrating an example of contact part determination based on a minute vibration according to the present embodiment. In the case of the example illustrated in FIG. 10, the user U1 strokes the abdomen of the autonomous operating body 10 and makes an utterance UO4 saying "Good boy!". However, since the touch sensor 540 according to the present embodiment is arranged only on the head, chin, and back of the autonomous operating body 10, it is usually difficult to recognize that the abdomen is stroked only by detection information by the touch sensor 540.

However, the autonomous operating body 10 according to the present embodiment can recognize that the abdomen is stroked by the user U1, by detecting the minute vibration generated by the contact action by the inertial sensor 555, and identifying that the minute vibration is vibration that is characteristic when the abdomen is stroked.

As described above, with the above function of the autonomous operating body 10 according to the present embodiment, it is possible to recognize the contact action by the user even for a part where the touch sensor 540 is not arranged, and recognition accuracy for the feedback can be more effectively improved.

<<1.4. System Configuration Example>>

Figure 11:
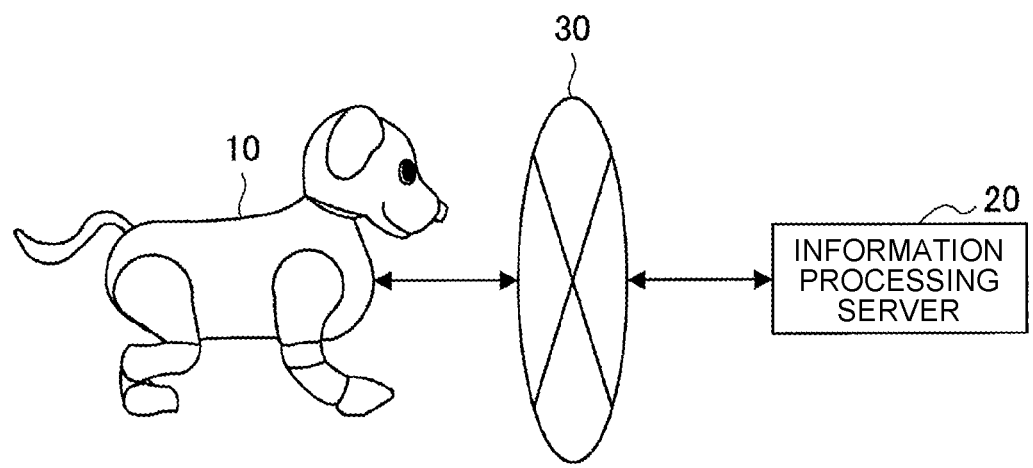
FIG. 11 is a diagram illustrating a configuration example of an information processing system according to the embodiment.

Next, a description will be given of a configuration example of an information processing system according to the present embodiment. FIG. 11 is a diagram illustrating the configuration example of the information processing system according to the present embodiment. As illustrated in FIG. 11, the autonomous operating body 10 and an information processing server 20 according to the present embodiment are included. Furthermore, the autonomous operating body 10 and the information processing server 20 are connected to be able to communicate with each other via a network 30.

(Autonomous Operating Body 10)

The autonomous operating body 10 according to the present embodiment is an information processing device that executes various types of recognition processing on the basis of the sensor information collected, and autonomously operates on the basis of results of the various types of recognition processing. As described above, the autonomous operating body 10 according to the present embodiment can recognize the feedback from the user on executed behavior with high accuracy by combining various types of recognition processing.

(Information Processing Server 20)

The information processing server 20 according to the present embodiment is an information processing device that collects various types of sensor information collected by the autonomous operating body 10 and results of learning by the autonomous operating body 10, and stores them as collective intelligence. Furthermore, the information processing server 20 according to the present embodiment may have a function of performing recognition processing and learning based on the above sensor information.

(Network 30)

The network 30 has a function of connecting the autonomous operating body 10 and the information processing server 20 to each other. The network 30 may include a public line network such as the Internet, a telephone line network, and a satellite communication network, various local area networks (LANs) including Ethernet (registered trademark), or wide area networks (WANs). Furthermore, the network 30 may include a dedicated line network such as an internet protocol-virtual private network (IP-VPN). Furthermore, the network 30 may include a wireless communication network such as Wi-Fi (registered trademark) or Bluetooth (registered trademark).

In the above, the configuration example has been described of the information processing system according to the present embodiment. Note that, the above configuration described with reference to FIG. 11 is merely an example, and the configuration of the information processing system according to the present embodiment is not limited to such an example. The configuration of the information processing system according to the present embodiment can be flexibly modified depending on specifications and operations.

<<1.5. Functional Configuration Example of Autonomous Operating Body 10>>

Figure 12:
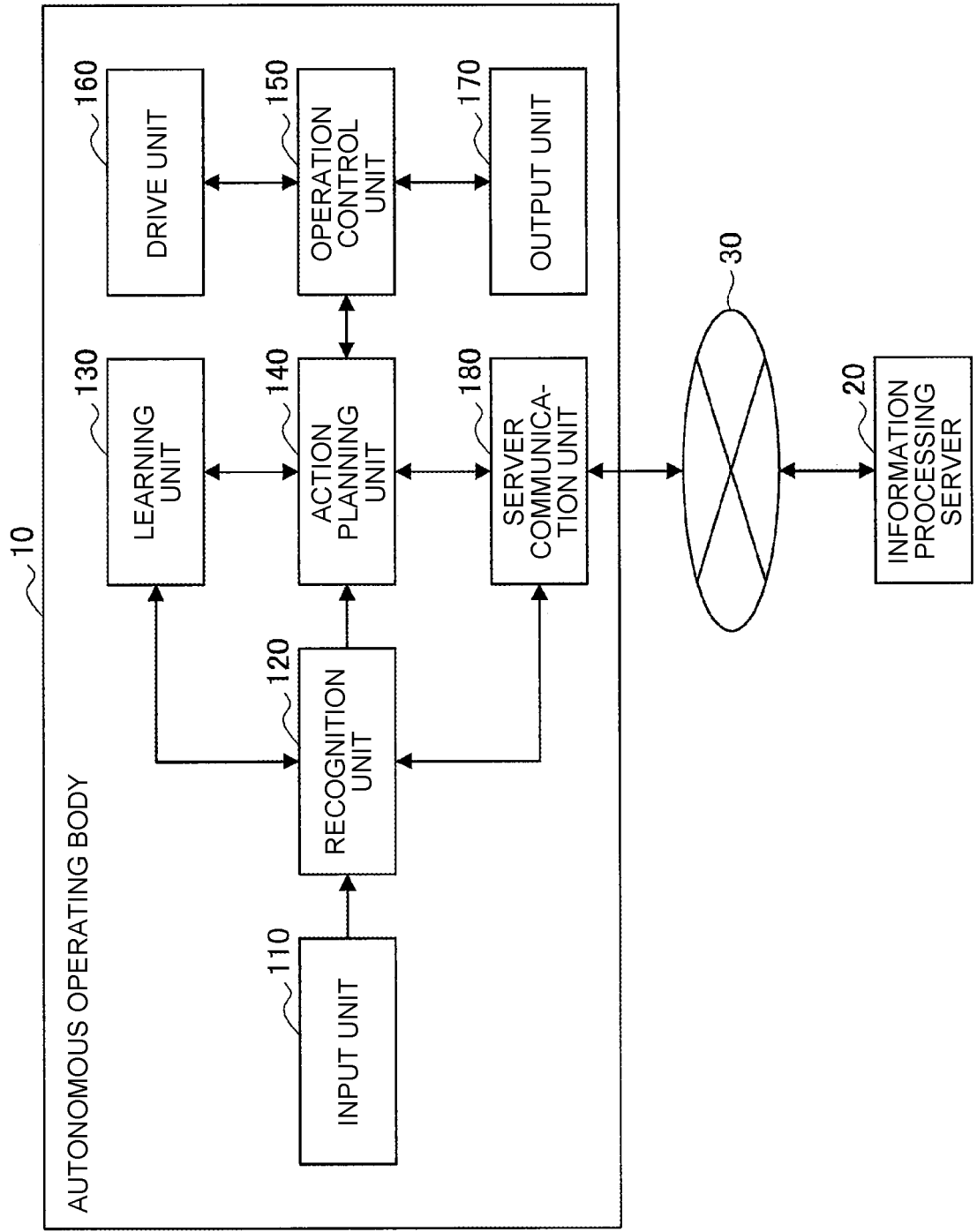
FIG. 12 is a block diagram illustrating a functional configuration example of the autonomous operating body according to the embodiment.

Next, a functional configuration example will be described of the autonomous operating body 10 according to the present embodiment. FIG. 12 is a block diagram illustrating a functional configuration example of the autonomous operating body 10 according to the present embodiment. As illustrated in FIG. 12, the autonomous operating body 10 according to the present embodiment includes an input unit 110, a recognition unit 120, a learning unit 130, an action planning unit 140, an operation control unit 150, a drive unit 160, an output unit 170, and a server communication unit 180.

(Input Unit 110)

The input unit 110 has a function of collecting various types of information related to the user and the surrounding environment. The input unit 110 collects, for example, the utterance of the user, the environmental sound generated in the surroundings, image information related to the user and the surrounding environment, and various types of sensor information. For this reason, the input unit 110 includes various sensors illustrated in FIG. 1.

(Recognition Unit 120)

The recognition unit 120 has a function of performing various types of recognition related to the user, the surrounding environment, and the state of the autonomous operating body 10 on the basis of the various types of information collected by the input unit 110. As an example, the recognition unit 120 may perform voice recognition, contact action recognition, person identification, facial expression and line-of-sight recognition, object recognition, movement recognition, spatial area recognition, color recognition, shape recognition, marker recognition, obstacle recognition, step recognition, brightness recognition, and the like.

Furthermore, one of features of the recognition unit 120 according to the present embodiment is that the recognition unit 120 recognizes the feedback from the user on the behavior on the basis of the recognition processing as described above. Details of the function of the recognition unit 120 according to the present embodiment will be described later separately.

(Learning Unit 130)

The learning unit 130 has a function of performing various types of learning on the basis of the sensor information collected by the input unit 110, and the like. For example, the learning unit 130 learns a relationship between a contact action at each part of the autonomous operating body 10 and the minute vibration generated by the contact action, by using a machine learning algorithm such as deep learning.

(Action Planning Unit 140)

The action planning unit 140 has a function of planning an action of the autonomous operating body 10 on the basis of various recognition results output by the recognition unit 120 and knowledge learned by the learning unit 130. Details of the function of the action planning unit 140 according to the present embodiment will be described later separately.

(Operation Control Unit 150)

The operation control unit 150 has a function of controlling operations of the drive unit 160 and the output unit 170 on the basis of an action plan by the action planning unit 140. The operation control unit 150 performs rotation control of the actuator 570, display control of the display 510, voice output control with the speaker, and the like on the basis of the above action plan, for example.

(Drive Unit 160)

The drive unit 160 has a function of bending and stretching a plurality of the joints included in the autonomous operating body 10 on the basis of the control by the operation control unit 150. More specifically, the drive unit 160 drives the actuator 570 included in each joint on the basis of the control by the operation control unit 150.

(Output Unit 170)

The output unit 170 has a function of outputting visual information and sound information on the basis of the control by the operation control unit 150. For this reason, the output unit 170 includes the display 510 and the speaker.

(Server Communication Unit 180)

The server communication unit 180 according to the present embodiment performs information communication with the information processing server 20 via the network 30.

Figure 13:
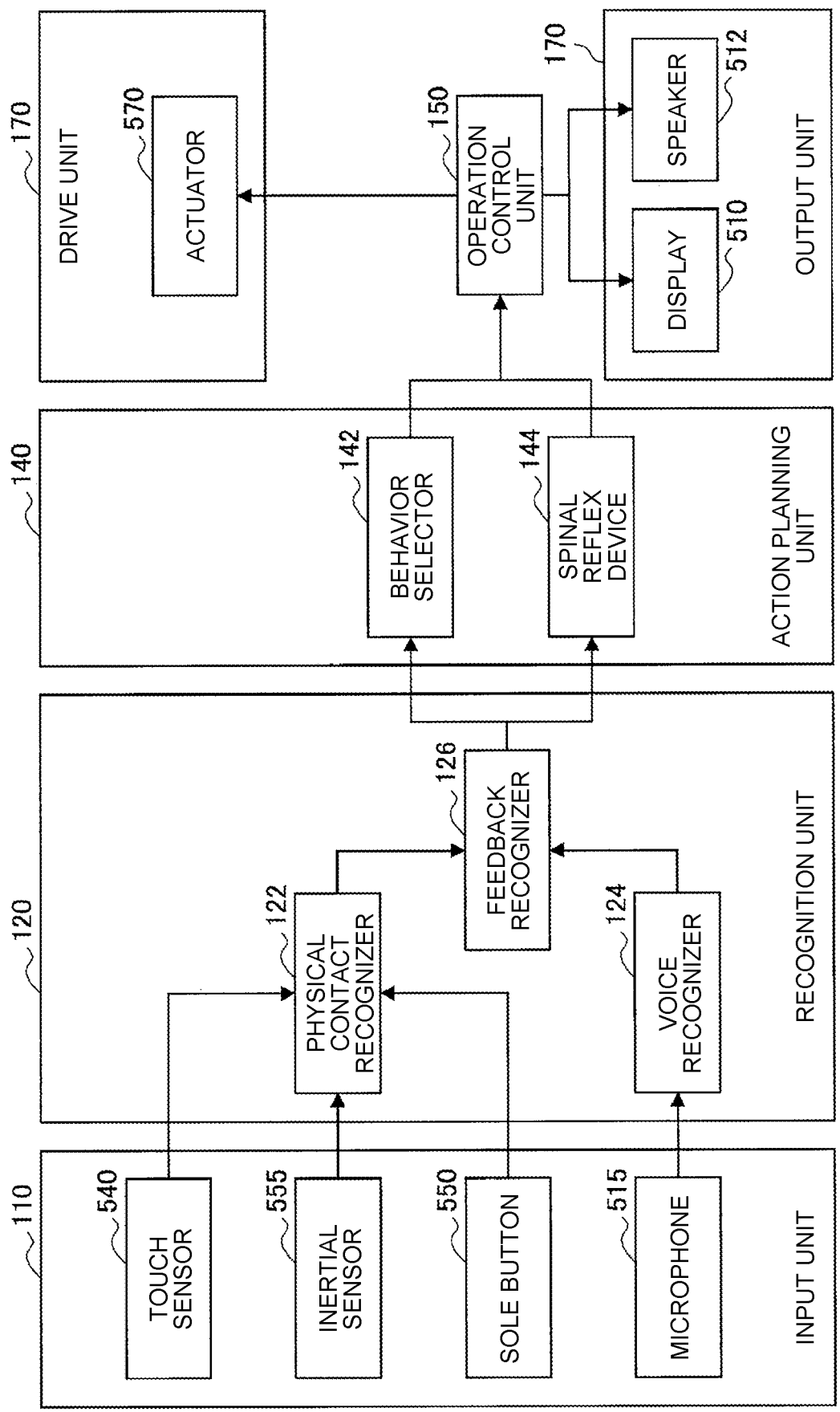
FIG. 13 is a block diagram illustrating a detailed functional configuration example of the autonomous operating body according to the embodiment.

In the above, an outline has been described of the functional configuration example of the autonomous operating body 10 according to the present embodiment. Subsequently, with reference to FIG. 13, a description will be given in more detail of the functional configuration of the autonomous operating body 10 according to the present embodiment. FIG. 13 is a block diagram illustrating a detailed functional configuration example of the autonomous operating body 10 according to the present embodiment. Note that, in FIG. 13, a configuration related to the feedback recognition according to the present embodiment is mainly illustrated.

As illustrated in the figure, the input unit 110 according to the present embodiment includes the touch sensor 540, the inertial sensor 555, the sole button 550, the microphone 515, and the like. Information on contact for the head, chin, and back detected by the touch sensor 540, posture information and vibration information detected by the inertial sensor 555, and a ground contact status detected by the sole button 550 are input to a physical contact recognizer 122 included in the recognition unit 120. Furthermore, sound information collected by the microphone 515 is input to a voice recognizer 124 included in the recognition unit 120.

As described above, the recognition unit 120 according to the present embodiment executes various types of recognition processing used to determine an action of the autonomous operating body 10 on the basis of various types of sensor information collected by the input unit 110. The recognition unit 120 according to the present embodiment includes, for example, the physical contact recognizer 122, the voice recognizer 124, and a feedback recognizer 126.

The physical contact recognizer 122 according to the present embodiment has a function of recognizing a contact action by the user for the autonomous operating body 10. Here, the above contact action includes, for example, an action of stroking and an action of hitting. At this time, the physical contact recognizer 122 according to the present embodiment can recognize the contact action as described above on the basis of the sensor information collected by the touch sensor 540 and the inertial sensor 555. Details of the function of the physical contact recognizer 122 according to the present embodiment will be described later separately.

Furthermore, the voice recognizer 124 according to the present embodiment recognizes the utterance of the user that is one of non-contact actions according to the present embodiment. Details of the function of the voice recognizer 124 according to the present embodiment will be described later separately.

Furthermore, the feedback recognizer 126 according to the present embodiment has a function of recognizing the fee back from the user on the behavior executed by the autonomous operating body 10. Furthermore, the feedback recognizer 126 according to the present embodiment has a function of recognizing the type and degree of the ford back on the basis of the recognition results of the contact action and the non-contact action by the user for the autonomous operating body 10.

Here, the above contact action refers to an action such as stroking or hitting. Furthermore, the above non-contact action may be an utterance, a gesture, a facial expression, or the like as a reaction to the behavior performed by the autonomous operating body 10. Such a non-contact action is recognized by components such as the voice recognizer 124, and a gesture recognizer (not illustrated) and a facial expression recognizer (not illustrated) included in the recognition unit 120. For example, the voice recognizer 124 may recognize the utterance on the basis of utterance information collected by the microphone 515, and the gesture recognizer and the facial expression recognizer may recognize the gesture and the facial expression, respectively, on the basis of an image Confucianism method by which the user is imaged. Details of the function of the feedback recognizer 126 according to the present embodiment will be described later separately.

Furthermore, the action planning unit 140 according to the present embodiment includes a behavior selector 142 and a spinal reflex device 144. The behavior selector 142 according to the present embodiment determines behavior to be executed by the autonomous operating body 10 on the basis of the results of various types of recognition processing by the recognition unit 120, such as the feedback from the user recognized by the feedback recognizer 126. Details of the function of the behavior selector 142 according to the present embodiment will be described later separately.

Furthermore, the spinal reflex device 144 according to the present embodiment determines a reflex action to be performed by the autonomous operating body 10 on the basis of the contact action or the non-contact action recognized by the recognition unit 120. The action may be performed simultaneously with the behavior selected by the behavior selector 142. For example, in a case where the utterance of the user is recognized, the spinal reflex device 144 may determine an action that moves the ear in a twitching manner. Furthermore, in a case where the contact action is recognized, an action may be determined that moves the eyes or the tail. Furthermore, in a case where both the contact action and the non-contact action are recognized, the spinal reflex device 144 may determine an action that moves the ears, eyes, and tail simultaneously.

Furthermore, the operation control unit 150 according to the present embodiment controls the actuator 570, the display 510, and the speaker 512 on the basis of the behavior selected by the behavior selector 142 and the action determined by the spinal reflex device 144.

In the above, the functional configuration example has been described of the autonomous operating body 10 according to the present embodiment. Note that, the above configuration described with reference to FIG. 13 is merely an example, and the functional configuration of the autonomous operating body 10 according to the present embodiment is not limited to such an example. The functional configuration of the autonomous operating body 10 according to the present embodiment can be flexibly modified depending on specifications and operations.

<<1.6. Details of Functions>>

Next, a description will be given in detail of each function of the autonomous operating body 10 according to the present embodiment. First, the function will be described of the physical contact recognizer 122 according to the present embodiment.

The physical contact recognizer 122 according to the present embodiment recognizes the contact action by the user for the head, chin, and back on the basis of the touch information detected by the touch sensor 540, for example.

Furthermore, as described above, the physical contact recognizer 122 according to the present embodiment can also recognize the contact action by the user for the part where the touch sensor 540 is not arranged.

FIG. 14 is a diagram for explaining recognition of the contact action using the inertial sensor 555 according to the present embodiment. As illustrated in FIG. 14, the autonomous operating body 10 according to the present embodiment includes inertial sensors 555a and 555b on the head and the body, respectively.

As described above, each joint of the autonomous operating body 10 according to the present embodiment has play, and due to a difference in the structural body inside the device, the minute vibration generated when the contact action is performed varies depending on each part.

For example, a case is assumed where the abdomen is stroked, as illustrated in FIG. 14. Here, a removable lid is attached to the abdomen of the autonomous operating body 10 according to the present embodiment, and a battery is arranged inside the lid. Furthermore, the actuator 570 that enables the joint of the neck to move is arranged between the abdomen and the head.

Moreover, since a distance between the abdomen where the contact action is performed and the inertial sensor 555a and a distance between the abdomen and the inertial sensor 555b are different from each other, different features may respectively appear in minute vibrations detected by the inertial sensors 555a and 555b as exemplified in the figure.

For this reason, the physical contact recognizer 122 according to the present embodiment may identify the part on which the contact action is performed, on the basis of the results of learning of the sensor information collected by the inertial sensor 555 due to the contact action for each part of the autonomous operating body 10, and the sensor information collected at the present time. The above learning is performed by, for example, supervised learning using a neural network.

With the above function of the physical contact recognizer 122 according to the present embodiment, even in a case where a contact action is performed on the part where the touch sensor 540 is not arranged, it becomes possible to recognize the contact action.

Note that, in a case where the autonomous operating body 10 is in a specific posture, the physical contact recognizer 122 can also detect the contact action more efficiently by limiting candidates to places where the contact action is predicted to be performed. For example, in a case where the autonomous operating body 10 is in a posture of showing the abdomen to the user, it is predicted that there is an extremely high possibility that the user performs the contact action for the abdomen. In this case, the physical contact recognizer 122 may recognize that a contact action is performed for the abdomen on the basis of the fact that a minute vibration is detected while the above posture is taken.

Furthermore, the physical contact recognizer 122 according to the present embodiment may be able to classify whether each contact action is positive feedback or negative feedback, and its degree, on the basis of the results of learning using the sensor information collected by the touch sensor 540 and the inertial sensor 555.

FIG. 15 is a diagram illustrating an example of classification of contact actions by the physical contact recognizer 122 according to the present embodiment. For example, as illustrated in the figure, in a case where the abdomen, back, or head is strongly hit, the physical contact recognizer 122 may classify the contact actions into negative ford back (VERY BAD).

Furthermore, for example, in a case where stroking is performed while the abdomen is shown, the physical contact recognizer 122 may classify the contact action as light positive feedback (GOOD).

In the above, the description has been given in detail of the function of the physical contact recognizer 122 according to the present embodiment. Next, a description will be given of the function of the voice recognizer 124 according to the present embodiment.

The voice recognizer 124 according to the present embodiment performs voice recognition and semantic analysis for the utterance of the user. Furthermore, the voice recognizer 124 according to the present embodiment may have a sound source localization estimation function of estimating a direction of the utterance of the user. For example, in a case where it is recognized that the name of the autonomous operating body 10 is included in the utterance as a result of the above processing, the voice recognizer 124 can also determine that the utterance is made to the autonomous operating body 10. As described above, the recognition unit 120 according to the present embodiment can determine whether or not the non-contact action by the user is for the autonomous operating body 10 on the basis of the sensor information collected by the input unit 110.

Furthermore, the voice recognizer 124 according to the present embodiment may be able to classify whether the utterance of the user is positive feedback or negative feedback, and its degree, on the basis of results of the voice recognition and semantic analysis.

FIG. 16 is a diagram illustrating an example of classification of contact actions by the voice recognizer 124 according to the present embodiment. For example, the voice recognizer 124 performs classification for each utterance from the results of the voice recognition and semantic analysis, as illustrated in the figure. For example, in a case where the recognized utterance is "You're the best", the voice recognizer 124 may classify the utterance as strong positive feedback (VERY GOOD). Furthermore, for example, in a case where the recognized utterance is "bad boy", the voice recognizer 124 may classify the utterance as strong negative feedback (VERY BAD).

Furthermore, the voice recognizer 124 can also perform classification in consideration of, for example, emotions of the user when the utterance is made, in addition to meanings of words included in the utterance. For example, in a case where a word "stupid" is input at a sound pressure of greater than or equal to a predetermined value with an emotion of anger, the word "stupid" that is normally classified as "BAD" may be classified as "VERY BAD".

Furthermore, the voice recognizer 124 may use sound source localization information for classification. For example, in a case where an utterance saying "Good boy" is recognized from the front of the autonomous operating body 10, the level may be raised by one rank from the normal time. This is because, similarly to the case of scolding a human child, utterance from the front is effective in a case where an attempt is made to convey intention clearly.

In the above, the description has been given in detail of the function of the voice recognizer 124 according to the present embodiment. Next, a description will be given of the function of the feedback recognizer 126 according to the present embodiment. As described above, the feedback recognizer 126 according to the present embodiment has the function of recognizing the feedback from the user on the behavior, on the basis of the contact action recognized by the physical contact recognizer 122 and the non-contact action recognized by the voice recognizer 124 or the like.

FIG. 17 is a flowchart illustrating a flow of the feedback recognition according to the present embodiment. In the example illustrated in FIG. 17, a case is illustrated where the utterance of the user is treated as an example of the non-contact action according to the present embodiment.

Referring to FIG. 17, first, the input unit 110 collects various types of sensor information (S1101). The sensor information according to the present embodiment includes various types of information such as a sound, image, acceleration, and angular velocity.

Next, voice recognition by the voice recognizer 124 (S1102), and recognition of the contact action by the physical contact recognizer 122 (S1103) are performed.

Next, the feedback recognizer 126 according to the present embodiment determines whether or not a voice recognition result and a contact action recognition result are acquired within a predetermined time (S1104).

Here, in a case where only one of the recognition results is acquired (S1104: NO), the feedback recognizer 126 performs feedback recognition using the acquired voice recognition result or contact action recognition result alone (S1106). That is, in a case where both the contact action recognition result and the non-contact action recognition result are not acquired within the predetermined time, the feedback recognizer 126 may recognize the type and degree of the feedback on the basis of the acquired recognition result of either the contact action or the non-contact action.

On the other hand, in a case where the recognition results of both are acquired (S1104: YES), the feedback recognizer 126 performs feedback recognition by combining the voice recognition result and the contact action recognition result (S1105).

Figures 18, 19:
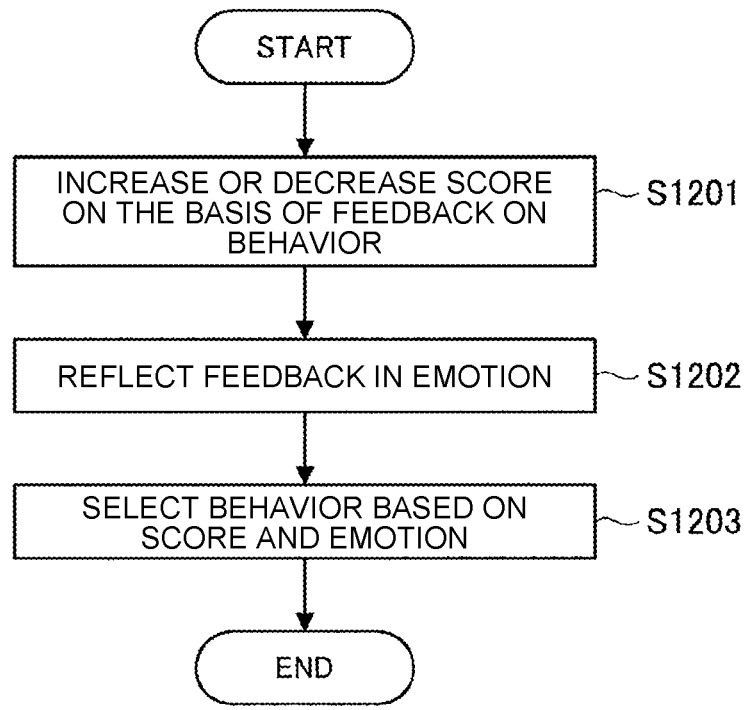
FIG. 18 is a diagram illustrating an example of the feedback recognition based on recognition of contact actions and non-contact actions according to the embodiment.
FIG. 19 is a flowchart illustrating a flow of processing by a behavior selector according to the embodiment.

FIG. 18 is a diagram illustrating an example of the feedback recognition based on recognition of contact actions and non-contact actions according to the present embodiment. For example, in a case where both the contact action and the non-contact action are recognized as positive feedback (GOOD), the feedback recognizer 126 may recognize the final classification of the feedback as "VERY GOOD".

Furthermore, for example, in a case where both the contact action and the non-contact action are recognized as negative feedback (BAD), the feedback recognizer 126 may recognize the final classification of the feedback as "VERY BAD".

On the other hand, in a case where the type of the feedback based on the recognition result of the contact action and the type of the feedback based on the recognition result of the non-contact action are not the same as each other, the feedback recognizer 126 recognizes the final type and degree of the feedback by giving weight to the recognition result of the contact action.

For example, in a case where the contact action is recognized as positive feedback (GOOD) and the non-contact action is recognized as negative feedback (BAD) as in the example illustrated in FIG. 18, the feedback recognizer 126 may recognize the final feedback as "GOOD".

Conversely, in a case where the contact action is recognized as negative feedback (BAD) and the non-contact action is recognized as positive feedback (GOOD), the feedback recognizer 126 may recognize the final feedback as "BAD".

With the above function of the feedback recognizer 126 according to the present embodiment, it is possible to preferentially treat the contact action that is more direct feedback, and it is expected that the accuracy of the feedback recognition is improved.

In the above, the description has been given of the details of the function of the feedback recognizer 126 according to the present embodiment. Note that, in the above, the case has been exemplified where the types of the feedback include two types of positive and negative and they are classified into two degrees, but the type and degree of the feedback according to the present embodiment are not limited to such an example.

Next, a description will be given in detail of the function of the behavior selector 142 according to the present embodiment. On the basis of the type and degree of the feedback recognized by the feedback recognizer 126, the behavior selector 142 according to the present embodiment increases or decreases a score related to the corresponding behavior to correct the score. Furthermore, the behavior selector 142 according to the present embodiment determines the behavior to be executed by the autonomous operating body 10 on the basis of the score acquired as described above.

The behavior selector 142 may, for example, perform subtraction on the score related to the corresponding behavior in a case where the recognized feedback is negative, and perform addition on the score related to the corresponding behavior in a case where the feedback is positive. Furthermore, in this case, the behavior selector 142 may preferentially select the behavior having a high score.

With the above function of the behavior selector 142 according to the present embodiment, it is possible to implement an action plan in which the praised behavior is more likely to be performed and the scolded behavior is less likely to be performed. As a result, the number of times of behavior that match the taste of the user is increased, whereby it is possible to improve a satisfaction level of the user. Furthermore, it is also possible to attract the user's interest more by setting special behavior or the like that is selected only in a case where the score exceeds a predetermined threshold value due to an increase or decrease of the score based on continuous feedback.

Furthermore, the feedback according to the present embodiment may be reflected in emotions of the autonomous operating body 10. The autonomous operating body 10 according to the present embodiment has emotions individually, and is designed so that the emotions change depending on recognized situations. For this reason, in a case where the behavior selector 142 according to the present embodiment reflects the type and degree of the feedback in an emotion of the autonomous operating body 10 and thus the emotion of the autonomous operating body 10 is inclined to joy by the feedback from the user, it is possible to make the subsequent action express joy, and to repeatedly execute the praised behavior.

The control as described above may be executed, for example, in a flow illustrated in FIG. 19. FIG. 19 is a flowchart illustrating the flow of processing by the behavior selector 142 according to the present embodiment.

Referring to FIG. 19, first, on the basis of the feedback on executed behavior, the behavior selector 142 calculates a score related to the behavior (S1201).

Next, the behavior selector 142 reflects the feedback on the emotion (S1202).

Next, the behavior selector 142 performs selection of the behavior based on the calculated score and the emotion (S1203).

In the above, the description has been given of the flow of the processing by the behavior selector 142 according to the present embodiment. Note that, in addition to the processing described above, the behavior selector 142 according to the present embodiment can perform various behavior selections based on the score or the like.

For example, the behavior selector 142 according to the present embodiment may preferentially select the behavior for which the score is not calculated. With the above control by the behavior selector 142 according to the present embodiment, by performing the behavior for which the feedback from the user has not yet been obtained, it is possible to prevent similar behavior from being repeatedly executed, for example, and it is expected to have an effect of not causing the user to be bored.

Furthermore, the behavior selector 142 according to the present embodiment may intentionally select behavior for which the user is expected to give negative feedback, and cause the autonomous operating body 10 to execute the behavior. With such control, it is possible to observe what kind of feedback is given when the user scolds the autonomous operating body 10.

Figure 20:
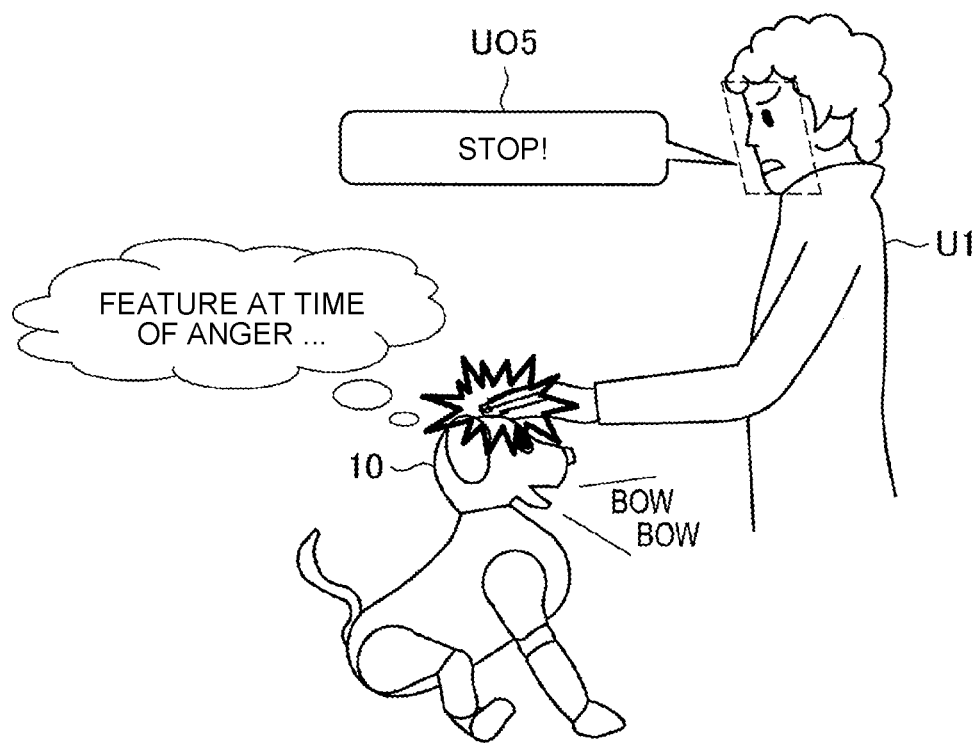
FIG. 20 is a diagram for explaining learning of a feedback aspect according to the embodiment.

FIG. 20 is a diagram for explaining learning of a feedback aspect according to the present embodiment. In the case of the example illustrated in FIG. 20, the behavior selector 142 selects the behavior of barking loudly as behavior for which the user U1 is expected to give negative feedback, that is, scold the autonomous operating body 10, and causes the autonomous operating body 10 to execute the behavior.

Furthermore, the user U1 makes an utterance U05 saying "Stop!" while frowning at the above behavior by the autonomous operating body 10, and further hits the head of the autonomous operating body 10.

As described above, with the behavior selector 142 according to the present embodiment, by causing the autonomous operating body 10 to intentionally execute the behavior that the user would scold, it is possible to collect information related to an aspect of negative feedback for each user without any discomfort.

At this time, the learning unit 130 according to the present embodiment learns the aspect of the negative feedback from the user on the basis of the feedback for the behavior as described above. As a result, it is possible to learn the aspect of the feedback for each user, and it is possible to implement more accurate feedback recognition.

Note that, the behavior selector 142 according to the present embodiment can also collect information related to the aspect of positive feedback for each user by causing the autonomous operating body 10 to intentionally execute the behavior that the user would praise.

2. CONCLUSION

As described above, the autonomous operating body 10 that implements an information processing method according to the embodiment of the present disclosure includes the recognition unit 120 that executes the recognition processing used to determine the action of the autonomous operating body 10 on the basis of the sensor information collected. Furthermore, the recognition unit 120 according to the embodiment of the present disclosure includes the feedback recognizer 126 that recognizes the feedback from the user on the behavior executed by the autonomous operating body 10. Furthermore, one of the features of the feedback recognizer 126 according to the embodiment of the present disclosure is that the feedback recognizer 126 recognizes the degree of the feedback on the basis of the recognition results of the contact action and non-contact action by the user for the autonomous operating body 10. With such a configuration, it is possible to recognize the feedback from the user on the behavior of the autonomous operating body with high accuracy.

In the above, the preferred embodiment of the present disclosure has been described in detail with reference to the accompanying drawings; however, the technical scope of the present disclosure is not limited to such an example. It is obvious that a person having ordinary knowledge in the technical field of the present disclosure can come up with various change examples or modification examples within the scope of the technical idea described in the claims, and it is understood that those examples also belong to the technical scope of the present disclosure of course.

Furthermore, the effects described in the present specification are merely explanatory or exemplary and are not restrictive. That is, the technologies according to the present disclosure may exhibit other effects obvious to those skilled in the art from the description of the present specification, in addition to or in place of the above effects.

Furthermore, it is also possible to create a program for hardware such as a CPU, ROM, and RAM incorporated into a computer to exert a function equivalent to the configuration of the autonomous operating body 10, and it is also possible to provide a computer readable non-transitory recording medium in which the program is recorded.

Furthermore, the steps related to the processing of the autonomous operating body 10 in the present specification do not necessarily have to be processed in time series in the order described in the flowchart. For example, the steps related to the processing of the autonomous operating body 10 may be processed in order different from the order described in the flowchart, or may be processed in parallel.

Note that, the following configurations also belong to the technical scope of the present disclosure.

(1)
An information processing device comprising
a recognition unit that executes recognition processing used to determine an action of an autonomous operating body on a basis of sensor information collected, wherein
the recognition unit includes a feedback recognizer that recognizes feedback from a user on behavior executed by the autonomous operating body, and
the feedback recognizer recognizes a degree of the feedback on a basis of recognition results of a contact action and a non-contact action by the user for the autonomous operating body.

(2)
The information processing device according to (1), wherein
the recognition unit recognizes the non-contact action on a basis of utterance information of the user or image information in which the user is imaged.

(3)
The information processing device according to (1) or (2), wherein
the recognition unit determines a type of the feedback on the basis of the recognition results of the contact action and the non-contact action.

(4)
The information processing device according to any one of (1) to (3), wherein
the recognition unit determines whether or not the non-contact action of the user is for the autonomous operating body, on the basis of the sensor information.

(5)
The information processing device according to any one of (1) to (4), wherein
in a case where a type of the feedback based on the recognition result of the contact action and a type of the feedback based on the recognition result of the non-contact action are not identical to each other, the feedback recognizer recognizes a final type and degree of the feedback by giving weight to the recognition result of the contact action.

(6)
The information processing device according to any one of (1) to (5), wherein
in a case where both the recognition result of the contact action and the result of the non-contact action are not acquired within a predetermined time, the feedback recognizer recognizes a type and the degree of the feedback on a basis of the recognition result of either the contact action or the non-contact action.

(7)
The information processing device according to any one of (1) to (6), wherein
the recognition unit further includes a physical contact recognizer that recognizes the contact action.

(8)
The information processing device according to (7), wherein
the physical contact recognizer recognizes the contact action on the basis of the sensor information collected by a touch sensor or an inertial sensor included in the autonomous operating body.

(9)
The information processing device according to (8), wherein
the physical contact recognizer identifies a part on which the contact action is performed of the autonomous operating body, on a basis of a learning result of the sensor information collected by the inertial sensor due to the contact action to each of parts of the autonomous operating body.

(10)
The information processing device according to (9), wherein
the autonomous operating body includes at least two of the inertial sensors, and
the physical contact recognizer recognizes the contact action for a part where the touch sensor is not arranged, on the basis of the sensor information collected by the two inertial sensors.

(11)
The information processing device according to any one of (1) to (10), further comprising
an action planning unit that determines the behavior to be executed by the autonomous operating body on a basis of a result of the recognition processing by the recognition unit.

(12)
The information processing device according to (11), wherein
the action planning unit corrects a score related to the behavior on a basis of a type and the degree of the feedback recognized by the feedback recognizer, and determines the behavior to be executed by the autonomous operating body on a basis of the score.

(13)
The information processing device according to (12), wherein
the action planning unit reflects the type and degree of the feedback in an emotion of the autonomous operating body.

(14)
The information processing device according to (12) or (13), wherein
the action planning unit causes the autonomous operating body to preferentially execute the behavior for which the score is not calculated.

(15)
The information processing device according to any one of (11) to (14), further comprising
a learning unit that learns an aspect of the feedback for each user.

(16)
The information processing device according to (15), wherein
the action planning unit causes the autonomous operating body to execute the behavior on which the user is predicted to give feedback that is negative, and
the learning unit learns the aspect of the feedback that is negative from the user on a basis of the feedback on the behavior.

(17)
An information processing method comprising
executing, by a processor, recognition processing used to determine an action of an autonomous operating body on a basis of sensor information collected, wherein
the executing the recognition processing further includes using a feedback recognizer that recognizes feedback from a user on behavior executed by the autonomous operating body, and recognizing a degree of the feedback on a basis of recognition results of a contact action and a non-contact recognition action by the user for the autonomous operating body.

(18)
A program for causing a computer to function as
an information processing device including
a recognition unit that executes recognition processing used to determine an action of an autonomous operating body on a basis of sensor information collected, wherein
the recognition unit includes a feedback recognizer that recognizes feedback from a user on behavior executed by the autonomous operating body, and
the feedback recognizer recognizes a degree of the feedback on a basis of recognition results of a contact action and a non-contact recognition action by the user for the autonomous operating body.

REFERENCE SIGNS LIST

10 AUTONOMOUS OPERATING BODY
110 INPUT UNIT
120 RECOGNITION UNIT
122 PHYSICAL CONTACT RECOGNIZER
124 VOICE RECOGNIZER
126 FEEDBACK RECOGNIZER
130 LEARNING UNIT
140 ACTION PLANNING UNIT
142 BEHAVIOR SELECTOR
144 SPINAL REFLEX DEVICE
150 OPERATION CONTROL UNIT

The invention claimed is:
1. An information processing device, comprising:
a recognition unit configured to execute recognition processing operation on an autonomous operating body based on sensor information,
wherein the recognition unit comprises:
a physical contact recognizer configured to:
recognize a contact action on a first part of the autonomous operating body,
wherein the first part of a plurality of parts of the autonomous operating body is identified based on first vibration information associated with the first part of the plurality of parts of the autonomous operating body, and
the first vibration information of the first part indicates a characteristic vibration generated at the first part at a time of the contact action, and
a feedback recognizer configured to:
recognize a feedback from a user on a first behavior of the autonomous operating body, and
recognize a degree of the feedback based on the recognized contact action and a non-contact action by the user for the autonomous operating body;
an action planning unit configured to determine an action of the autonomous operating body based on the contact action and the degree of the feedback recognized by the feedback recognizer; and
an operation control unit configured to control one or more operations of the autonomous operating body based on the action determined by the action planning unit.

2. The information processing device according to claim 1, wherein the recognition unit is further configured to recognize the non-contact action based on one of utterance information of the user or image information in which the user is imaged.

3. The information processing device according to claim 1, wherein the recognition unit is further configured to determine a type of the feedback based on the recognized contact action and the non-contact action.

4. The information processing device according to claim 1, wherein the recognition unit is further configured to determine, that the non-contact action of the user is for the autonomous operating body based on the sensor information.

5. The information processing device according to claim 1, wherein in a case where a first type of the feedback based on the recognized contact action and a second type of the feedback based on the non-contact action are not identical to each other, the feedback recognizer is further configured to recognize a final type and the degree of the feedback based on the recognized contact action.

6. The information processing device according to claim 1, wherein in a case where both the contact action and the non-contact action are not recognized within a predetermined time, the feedback recognizer is further configured to recognize a type and the degree of the feedback based on one of the contact action or the non-contact action.

7. The information processing device according to claim 1, wherein the physical contact recognizer is further configured to recognize the contact action based on the sensor information,
wherein the sensor information is collected by one of a touch sensor or an inertial sensor of the autonomous operating body.

8. The information processing device according to claim 7, wherein the first vibration information of the first part of the autonomous operating body is determined based on a learning result of the sensor information collected by the inertial sensor due to the contact action to the first part of the autonomous operating body.

9. The information processing device according to claim 8, wherein the autonomous operating body includes at least two inertial sensors, wherein the at least two inertial sensors comprises the inertial sensor, and
the physical contact recognizer is further configured to recognize the contact action for a second part where the touch sensor is not arranged, based on second vibration information associated with the second part,
wherein the second vibration information is collected by the at least two inertial sensors.

10. The information processing device according to claim 1, wherein the action planning unit is further configured to:
correct a score related to the first behavior based on a type and the degree of the feedback recognized by the feedback recognizer, and
determine a second behavior to be executed by the autonomous operating body based on the score.

11. The information processing device according to claim 10, wherein the action planning unit is further configured to reflect the type and the degree of the feedback in an emotion of the autonomous operating body.

12. The information processing device according to claim 10, wherein the action planning unit is further configured to execute a third behavior of the autonomous operating body for which the score is not calculated.

13. The information processing device according to claim 1, further comprising a learning unit configured to learn an aspect of the feedback for the user.

14. The information processing device according to claim 13, wherein
the action planning unit is further configured to execute a fourth behavior of the autonomous operating body on which the user is predicted to give a negative, and
the learning unit is further configured to learn the aspect of the negative feedback on the fourth behavior.

15. An information processing method, comprising:
executing, by a processor, recognition processing on an autonomous operating body based on sensor information,
wherein the executing the recognition processing further comprises:
recognizing a contact action on a first part of the autonomous operating body,
wherein the first part of a plurality of parts of the autonomous operating body is identified based on first vibration information associated with the first part of the plurality of parts of the autonomous operating body, and
wherein the first vibration information of the first part corresponds to a characteristic vibration generated at the first part at a time of the contact action,
recognizing feedback from a user on a behavior executed by the autonomous operating body,
recognizing a degree of the feedback based on recognition results of the contact action and a non-contact action by the user for the autonomous operating body,
determining an action of the autonomous operating body based on the recognized contact action and the recognized degree of the feedback; and
controlling one or more operations of the autonomous operating body based on the determined action.

16. A non-transitory computer-readable medium having stored thereon, computer-executable instructions which, when executed by a computer, cause the computer to execute operations, the operations comprising:
executing recognition processing on an autonomous operating body based on sensor information,
wherein the executing the recognition processing further comprises:
recognizing a contact action on a first part of the autonomous operating body,
wherein the first part of a plurality of parts of the autonomous operating body is identified based on first vibration information associated with the first part of the plurality of parts of the autonomous operating body, and
wherein the first vibration information of the first part corresponds to a characteristic vibration generated at the first part at a time of the contact action,
recognizing feedback from a user on a behavior executed by the autonomous operating body, and
recognizing a degree of the feedback based on recognition results of the contact action and a non-contact action by the user for the autonomous operating body;
determining an action of the autonomous operating body based on the recognized contact action and the recognized degree of the feedback; and
controlling one or more operations of the autonomous operating body based on the determined action.

17. An information processing device, comprising:
a recognition unit configured to execute recognition processing operation on an autonomous operating body based on sensor information,
wherein the recognition unit comprises:
a physical contact recognizer configured to:
recognize a contact action on a first part of the autonomous operating body based on the sensor information collected by one of a touch sensor or an inertial sensor of the autonomous operating body,
wherein the first part of a plurality of parts of the autonomous operating body is identified based on vibration information associated with the first part of the plurality of parts of the autonomous operating body, and
wherein the vibration information of the first part of autonomous operating body is determined based on a learning result of the sensor information collected by the inertial sensor due to the contact action to the first part of the autonomous operating body, and
a feedback recognizer configured to:
recognize a feedback from a user on a behavior executed by the autonomous operating body, and
recognize a degree of the feedback based on the recognized contact action and a non-contact action by the user for the autonomous operating body;
an action planning unit configured to determine an action of the autonomous operating body based on the contact action and the degree of feedback recognized by the recognition unit; and
an operation control unit configured to control one or more operations of the autonomous operating body based on the action determined by the action planning unit.

* * * * *